(12) United States Patent
Veeningen

(10) Patent No.: US 11,233,774 B2
(45) Date of Patent: Jan. 25, 2022

(54) EVALUATION OF EVENTS USING A FUNCTION

(71) Applicant: KONINKLIJKE PHILIPS N.V., Eindhoven (NL)

(72) Inventor: Meilof Geert Veeningen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 26 days.

(21) Appl. No.: 16/954,826

(22) PCT Filed: Dec. 14, 2018

(86) PCT No.: PCT/EP2018/084925
§ 371 (c)(1),
(2) Date: Jun. 17, 2020

(87) PCT Pub. No.: WO2019/121384
PCT Pub. Date: Jun. 27, 2019

(65) Prior Publication Data
US 2021/0144127 A1 May 13, 2021

Related U.S. Application Data

(60) Provisional application No. 62/609,638, filed on Dec. 22, 2017.

(51) Int. Cl.
*H04L 29/06* (2006.01)
(52) U.S. Cl.
CPC ........ *H04L 63/0428* (2013.01); *H04L 63/062* (2013.01); *H04L 63/065* (2013.01)

(58) Field of Classification Search
CPC . H04L 63/062; H04L 63/0428; H04L 63/065; H04L 9/00; H04L 2209/46
USPC ........................................................ 713/168
See application file for complete search history.

(56) References Cited

U.S. PATENT DOCUMENTS

| | | | | |
|---|---|---|---|---|
| 8,443,205 | B2* | 5/2013 | Kolesnikov | H04L 9/06 713/189 |
| 8,539,220 | B2* | 9/2013 | Raykova | H04L 9/3218 713/150 |
| 8,881,295 | B2* | 11/2014 | Kolesnikov | H04L 9/14 726/26 |
| 8,891,766 | B2* | 11/2014 | Kolesnikov | H04L 9/3218 380/255 |
| 8,977,855 | B2* | 3/2015 | Kolesnikov | G09C 1/00 713/171 |

(Continued)

OTHER PUBLICATIONS

Huang, Y. et al., "Quid-pro-quo-tocols: Strengthening semi-honest protocols with dual execution". IEEE Symposium on Security and Privacy, SP 2012, 21-33 May 2012, San Francisco, CA, pp. 272-284, 2012.

(Continued)

*Primary Examiner* — Amare F Tabor

(57) ABSTRACT

According to an aspect, there is provided a first node for evaluating an event using a function. A corresponding computer-implemented method of operating a first node to 5 evaluate an event using a function is also provided. The function is evaluated by two parties using garbled circuits, with each party garbling a circuit representing the function, and evaluating the circuit garbled by the other party.

24 Claims, 9 Drawing Sheets

(56) References Cited

U.S. PATENT DOCUMENTS

| | | | |
|---|---|---|---|
| 8,990,570 B2* | 3/2015 | Kolesnikov | H04L 9/3218 |
| | | | 713/171 |
| 9,055,038 B1* | 6/2015 | Lu | H04L 63/0428 |
| 9,124,417 B2* | 9/2015 | Kolesnikov | H04L 9/06 |
| 10,178,090 B2* | 1/2019 | Pe'er | H04L 9/0894 |
| 10,972,263 B2* | 4/2021 | Gryb | H04L 9/085 |
| 11,044,107 B2* | 6/2021 | Adams | H04L 9/0866 |
| 2020/0304293 A1* | 9/2020 | Gama | G06N 3/08 |

OTHER PUBLICATIONS

Bellare, M. et al., "Efficient Garbling from a Fixed-Key Blockcipher", IACR Cryptology ePrint Archive 2013, p. 426.

Chou, T. et al., "The Simplest Protocol for Oblivious Transfer". Cryptology—LATINCRYPT 2015,4th International Conference on Cryptology and Information Security in Latin America, Guadalajara, Mexico, 2015.

Nielsen, J.B. et al., "A New Approach to Practical Active-Secure Two-Party Computation". Advances in Cryptology—Crypto 2012, pp. 681-700.

Mood, B. et al., "Reuse It or Lose It: More Efficient Secure Computation Through Reuse of Encrypted Values", Computer and Communications Security, ACM, (Nov. 3, 2014), pp. 582-596.

Tang, D. et al., "Reusable garbled gates for new fully homomorphic encryption service", International Journal of Web and Grid Services, vol. 13, No. 1 (Jan. 1, 2017), p. 25.

\* cited by examiner

| Wire | Wire keys, C | | | |
|---|---|---|---|---|
| $e_1$ ... $e_J$ | $C^0_{e1}, C^0_{eJ}$ ... $C^1_{e1}, C^1_{eJ}$ | | | |
| $c_1$ ... $c_K$ | | $A^0_{u1}, A^0_{uK}$ ... $A^1_{u1}, A^1_{uK}$ | | |
| $r_1$ ... $r_M$ | | | $C^0_{r1}, C^0_{rM}$ ... $C^1_{r1}, C^1_{rM}$ | |
| $u_1$ ... $u_K$ | | | | $C^0_{u1}, C^0_{uK}$ ... $C^1_{u1}, C^1_{uK}$ |

Columns (braces): $C_e$ (106), $A_u$ (108), $C_r$ (110), $C_u$ (112)

Second client node 6

FIG. 8

| Wire | Wire keys, D | | | |
|---|---|---|---|---|
| $e_1$ ... $e_J$ | $D^0_{e1}, D^0_{eJ}$ ... $D^1_{e1}, D^1_{eJ}$ | | | |
| $c_1$ ... $c_{KK}$ | | $B^0_{u1}, B^0_{uK}$ ... $B^1_{u1}, B^1_{uK}$ | | |
| $r_1$ ... $r_M$ | | | $D^0_{r1}, D^0_{rM}$ ... $D^1_{r1}, D^1_{rM}$ | |
| $u_1$ ... $u_K$ | | | | $D^0_{u1}, D^0_{uK}$ ... $D^1_{u1}, D^1_{uK}$ |

Columns (braces): $D_e$ (106), $B_u$ (108), $D_r$ (110), $D_u$ (112)

Server 4

EVALUATION OF EVENTS USING A FUNCTION

CROSS-REFERENCE TO PRIOR APPLICATIONS

This application is the U.S. National Phase application under 35 U.S.C. § 371 of International Application No. PCT/EP2018/084925, filed on Dec. 14, 2018, which claims the benefit of U.S. Patent Application No. 62/609,638, filed on Dec. 22, 2017. These applications are hereby incorporated by reference herein.

TECHNICAL FIELD

Various embodiments relate to the evaluation of a first event using a function, and in particular to a node for use in evaluating a first event using a function, and a method of operating the same.

BACKGROUND

The recent developments in Big Data have given rise to an almost unlimited amount of data that can be potentially used to make better decisions. Data analysis algorithms make it possible to perform complex analysis of this data and find trends and anomalies. Such an analysis allows refined conclusions about current events and predictions about future events to be made. This could lead to a huge impact in domains such as healthcare (for example based on an analysis of patient information) and finance (for example based on an analysis of trading data).

However, the data to be the subject of this sort of data analysis is often collected by a wide variety of companies and institutions, for a wide variety of reasons, and is not typically available in a single location where it can be analysed. There are many reasons why such information cannot easily be stored or combined in a single location. One obvious concern is privacy; there are strong legal constraints on how privacy-sensitive information can be used (particularly for healthcare-related information), but other concerns are that certain data is valuable or classified, or the owner simply does not want to release it. These concerns are in direct conflict with a desire to perform data analysis.

In some forms of data analysis, it is desired to perform a continuous monitoring of events (e.g. data measurements) to determine if a new event meets a trigger condition, and if so to trigger an alert or other process. An example of a simple trigger condition could be "the reported value (event) is outside the allowed bandwidth or range". An example of a more complex trigger condition could be "the reported value (event) is not within one standard deviation of the mean of the last 1000 entries", to "the extrapolated prognosis over data reported in the last half year forecasts disaster for next year".

SUMMARY

In view of the foregoing, it would be beneficial to provide improved techniques for evaluating a function to determine if a trigger condition is satisfied when one or more of the parties involved is unwilling or unable to share relevant information, such as event information.

Privacy-preserving computation (PPC) allows the computation of a joint function on sensitive (private) inputs from mutually distrusting parties without requiring those parties to disclose these inputs to a trusted third party. In general terms, a typical problem in privacy/security is that party A has a value X1 and party B has a value X2, and both parties wish to keep their values secret from the other party, but they also want to compute a certain function f:(Y1,Y2)=f(X1, X2), where output Y1 should go only to party A and output Y2 should only go to party B. PPC allows this problem to be addressed, and so PPC could—at least in theory—solve the problem of combining various datasets in a single analysis, without the need to share the actual content of these datasets.

However, currently this analysis is static in the sense that all the data or datasets that are needed as an input to the analysis are available before the computation starts, and the computation gives an output on those particular inputs. This means that whenever the input data changes, the whole secure computation needs to be run again, so the current approaches are not particularly suitable for monitoring scenarios in which a new data event occurs and it needs to be evaluated against preceding events (for which a computation has already been completed).

This problem can be reduced by providing for the monitoring to be implemented using incremental functions, with the evaluation of the monitoring function being performed using a privacy preserving computation. This provides the advantage that the party evaluating the monitoring function does not need to have access to all (or even most) of the input information required to complete the evaluation, which addresses issues with respect to the sharing of privacy-sensitive, competition-sensitive, company-proprietary, or classified data.

Thus the monitoring function can take a current monitoring state and the latest event as inputs and produce a new (updated) monitoring state, an indication of whether a trigger condition has been met and a public output. The monitoring state contains all the information necessary to evaluate the trigger condition given all previously-received events. The updated monitoring state is then used as an input to the monitoring function for the evaluation of the next event. Such a function is called an incremental computation.

It will be appreciated that in these data analysis scenarios envisaged herein, the party providing the input event to be evaluated may change over time (for example different parties may be measuring events, and each need to submit the events for analysis). Existing techniques for two-party computations assume that the two roles are fixed during the entire computation. In the scenario mentioned above, one role is fixed (a server, for example) and the other role (a client, for example) can move between several parties due to the use of incremental functions.

As noted above, the evaluation of the monitoring function should be performed in a privacy-preserving way. One way in which the privacy preserving computation can be implemented is through the use of a garbled circuit. In this case a first party produces a so-called 'garbled circuit', which is a one-time encrypted version of a binary circuit for the function that can be evaluated by a second party without the second party knowing the actual values of the wires in the circuit. The second party evaluates the garbled circuit using their input and determines an encrypted output for the function.

Provided that each of the clients and server involved in the various evaluations of the monitoring function operate faithfully, then privacy of the inputs can be preserved and authenticity of the determined output assured. However, this is not always a reasonable assumption, especially in the monitoring setting where it is expected that a large number of different clients, who do not all know each other, cooperate. In such a setting, where the server and multiple clients do not necessarily trust each other to perform the protocols faithfully, there are at least two desirable characteristics. The first is that each client should be sure that no information about its inputs leaks to any (combination of) other parties, except as implied by the state of the monitoring function, and the second is that neither any client nor the server by itself should be able to manipulate the state update operation so that an incorrect result is produced.

In the case of garbled circuits, a solution where the server garbles the circuit and the client evaluates it allows an actively corrupted server to manipulate which function is computed and, working with a passively corrupted other client, obtain information about the client's inputs. A solution where the client garbles the circuit and the server evaluates it has the feature that the client is sure that no information from its inputs leaks, but an actively corrupted client can now manipulate the state update operation.

In view of these problems, the techniques described herein provide that the function is evaluated twice: once with the circuit being garbled by the server and evaluated by the client, and once with the circuit being garbled by the client and evaluated by the server. This is referred to as 'dual execution'. Dual execution is described in "Quid-pro-quo-tocols: Strengthening semi-honest protocols with dual execution" by Huang et al., IEEE Symposium on Security and Privacy, SP 2012, 21-23 May 2012, San Francisco, Calif., USA, pages 272-284, 2012, and the techniques described herein modify and apply the dual execution described in this paper to the evaluation of a function as an incremental computation.

Thus, according to a first aspect, there is provided a first node for use in evaluating a first event using a function, wherein the function is represented by a first circuit comprising one or more logic operations, the first circuit having one or more current state input wires for inputting a current state of the function into the first circuit and one or more event input wires for inputting the first event into the first circuit, and the first circuit having one or more result output wires for outputting an indication of the result of the evaluation of the first event using the function, and one or more updated state output wires for outputting an updated state of the function, the first node being configured to obtain current state information, wherein the current state information comprises (i) a first set of wire keys comprising a respective subset of wire keys for each of the one or more current state input wires, each subset of wire keys comprising a plurality of wire keys, each wire key in the plurality being associated with a possible value for the respective current state input wire, and (ii) a current state in the form of a respective wire key for each of the one or more current state input wires, wherein each respective wire key is from a second set of wire keys, each respective wire key representing a value for a respective one of the one or more current state input wires; garble the first circuit using the first set of wire keys and a third set of wire keys to form a first garbled circuit, wherein the first set of wire keys are used for the one or more current state input wires and the third set of wire keys comprises a respective subset of wire keys for each of the one or more event input wires, and for each of the output wires in the first circuit, each subset of wire keys in the third set comprising a plurality of wire keys, each wire key in the plurality being associated with a possible value for the respective event input wire or output wire; send, to a second node, a representation of the first garbled circuit and one or more wire keys from the third set of wire keys representing the first event for evaluation by the second node; receive, from the second node, a representation of a second garbled circuit, wherein the second garbled circuit is the first circuit garbled by the second node using the second set of wire keys for the one or more current state input wires and a fourth set of wire keys comprising a respective subset of wire keys for each other input wire and for each output wire in the first circuit, each subset of wire keys in the fourth set comprising a plurality of wire keys, each wire key in the plurality being associated with a possible value for the respective other input wire or output wire; receive, from the second node, one or more wire keys from the fourth set of wire keys representing the first event; evaluate the representation of the second garbled circuit using the received representation of the second garbled circuit, the obtained one or more wire keys from the second set of wire keys representing the current state and the received one or more wire keys from the fourth set of wire keys representing the first event, wherein the evaluation determines one or more wire keys from the fourth set of wire keys for the one or more result output wires, and one or more wire keys from the fourth set of wire keys for the one or more updated state output wires; and cooperate with the second node to determine the result of the evaluation of the first event from the evaluation of the first garbled circuit by the second node and the evaluation of the second garbled circuit by the first node.

According to a second aspect, there is provided a computer-implemented method of operating a first node to evaluate a first event using a function, wherein the function is represented by a first circuit comprising one or more logic operations, the first circuit having one or more current state input wires for inputting a current state of the function into the first circuit and one or more event input wires for inputting the first event into the first circuit, and the first circuit having one or more result output wires for outputting an indication of the result of the evaluation of the first event using the function, and one or more updated state output wires for outputting an updated state of the function, the method comprising the steps of obtaining current state information, wherein the current state information comprises (i) a first set of wire keys comprising a respective subset of wire keys for each of the one or more current state input wires, each subset of wire keys comprising a plurality of wire keys, each wire key in the plurality being associated with a possible value for the respective current state input wire, and (ii) a current state in the form of a respective wire key for each of the one or more current state input wires, wherein each respective wire key is from a second set of wire keys, each respective wire key representing a value for a respective one of the one or more current state input wires; garbling the first circuit using the first set of wire keys and a third set of wire keys to form a first garbled circuit, wherein the first set of wire keys are used for the one or more current state input wires and the third set of wire keys comprises a respective subset of wire keys for each of the one or more event input wires, and for each of the output wires in the first circuit, each subset of wire keys in the third set comprising a plurality of wire keys, each wire key in the plurality being associated with a possible value for the respective event input wire or output wire; sending, to a second node, a representation of the first garbled circuit and one or more wire keys from the third set of wire keys representing the first event for evaluation by the second node; receiving, from the second node, a representation of a second garbled circuit, wherein the second garbled circuit is the first circuit garbled by the second node using the second set of wire keys for the one or more current state input wires and a fourth set of wire keys comprising a respective subset of wire keys for each other input wire and for each output wire in the first circuit, each subset of wire keys in the fourth set comprising a plurality of wire keys, each wire key in the plurality being associated with a possible value for the respective other input wire or output wire; receiving, from the second node, one or more wire keys from the fourth set of wire keys representing the first event; evaluating the representation of the second garbled circuit using the received representation of the second garbled circuit, the obtained one or more wire keys from the second set of wire keys representing the current state and the received one or more wire keys from the fourth set of wire keys representing the first event, wherein the evaluation determines one or more wire keys from the fourth set of wire keys for the one or more result output wires, and one or more wire keys from the fourth set of wire keys for the one or more updated state output wires; and cooperating with the second node to determine the result of the evaluation of the first event from the evaluation of the first garbled circuit by the second node and the evaluation of the second garbled circuit by the first node.

According to a third aspect, there is provided a computer program product comprising a computer readable medium having computer readable code embodied therein, the computer readable code being configured such that, on execution by a suitable computer or processor, the computer or processor is caused to perform the method of the second aspect.

BRIEF DESCRIPTION OF THE DRAWINGS

Exemplary embodiments will now be described, by way of example only, with reference to the following drawings, in which:

FIG. 5 is a table showing wire keys generated by a first client node to garble the circuit;

FIG. 6 is a table showing wire keys generated by a server to garble the circuit;

FIG. 7 is a table showing wire keys generated by a second client node to garble the circuit;

FIG. 8 is a table showing wire keys generated by a server to garble the circuit;

DETAILED DESCRIPTION OF THE EMBODIMENTS

Figure 1:
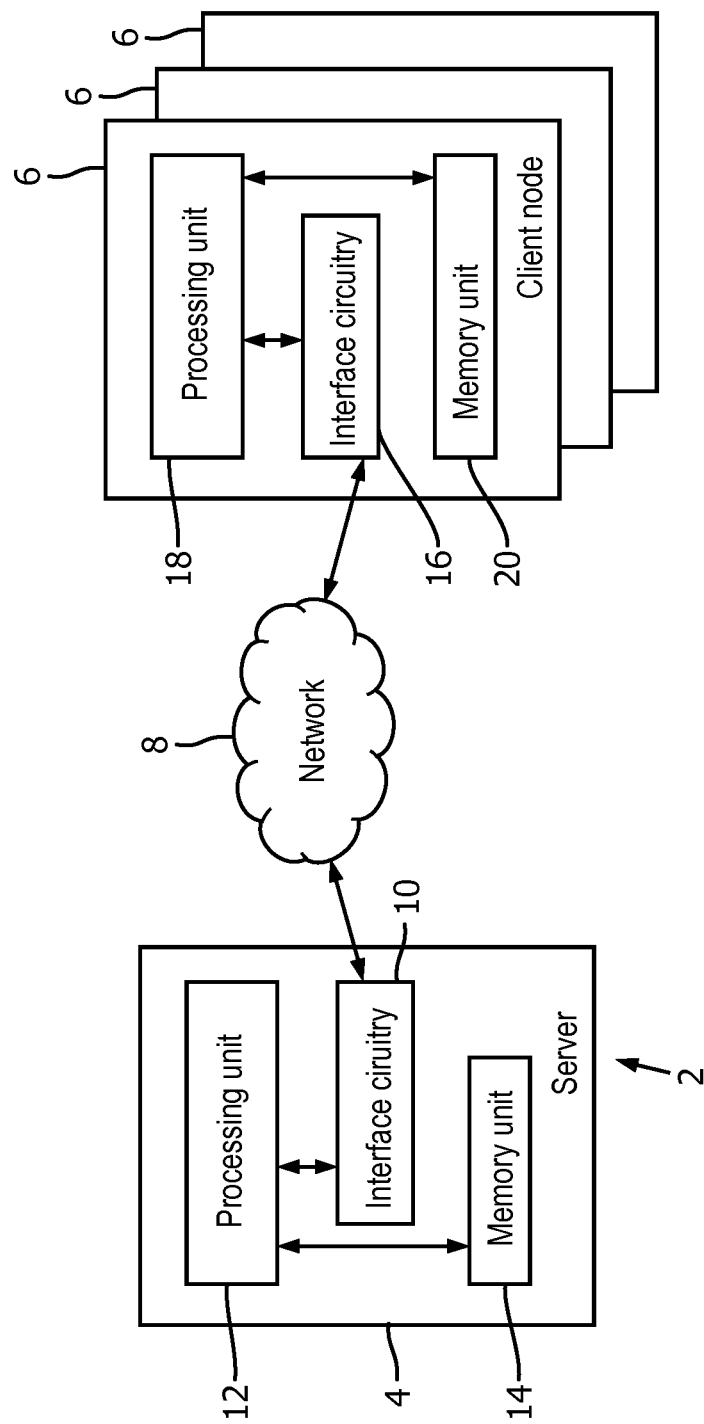
FIG. 1 is a block diagram of a system comprising a server and a plurality of client nodes.

FIG. 1 is a block diagram of a system 2 in which the techniques and principles described herein may be implemented. The system 2 comprises a fixed party 4, which is referred to herein as a server 4, and one or more other parties 6, which are referred to herein as client nodes 6. Although FIG. 1 shows three client nodes 6, it will be appreciated that a system 2 can include more or less than three client nodes 6. More generally, the server 4 and clients nodes 6 can be referred to simply as 'nodes'.

In embodiments of the techniques described herein, a function is to be evaluated based on an event that is measured or observed. In certain embodiments the server 4 is responsible for evaluating the function with respect to an event measured or observed by a client node 6. In other embodiments a client node 6 can be responsible for evaluating the function with respect to an event measured or observed by a server 4. More generally, although various techniques are described herein as involving a server 4 and one or more client nodes 6, for example a server 4 and a client node 6 using a function to evaluate an event measured or observed by the client node 6, it will be appreciated that the techniques described herein are not limited to this scenario, and in fact the techniques described herein can be applied to any two nodes 4, 6 that can use a function to evaluating an event measured or observed by one of the nodes 4, 6.

The function is evaluated as a two-party privacy-preserving computation (PPC) with a node (e.g. a server 4) being one of the parties and another node (e.g. a client node 6) that has the event to be evaluated being the other party. If an event is subsequently measured or observed by a different one of the client nodes 6 (e.g. a second client node 6), the role of the server 4 in the computation may not change, and the other party may now be the second client node 6. Thus, the server 4 can be a fixed party 4 in the sense that the server 4 is always a party to the evaluation of the function, regardless of which client node 6 has an event to be evaluated. Alternatively, either party can change from one computation to the next.

The server 4 and client nodes 6 are interconnected via a network 8, such as the Internet, and thus may be located at respectively different locations. Of course, it will be appreciated that one or more of the client nodes 6 may be local to the server 8, and interconnected via a wired or wireless connection.

The server 4 (or more generally the fixed party 4) can be any type of electronic device or computing device that client nodes 6 can connect to in order to evaluate an event for those client nodes 6 with respect to a function.

A client node 6 can be any type of electronic device or computing device that can connect to a server 4 in order to evaluate an event for the client node 6 with respect to a function. For example a client node 6 can be a computer (including a server), laptop, tablet computer, smart phone, etc. It will be appreciated that the client node 6 does not have to measure or observe the event itself (e.g. it does not need to make the measurement of a patient parameter), but could receive the event from another device or retrieve the event from a database local to the client node 6.

The server 4 includes interface circuitry 10 for enabling a data connection to other devices, such as the client nodes 6. In particular the interface circuitry 10 can enable a connection between the server 4 and the network 8, such as the Internet, via any desirable wired or wireless communication protocol. The server 4 further includes a processing unit 12 for performing operations on data and for generally controlling the operation of the server 4. The server 4 further includes a memory unit 14 for storing any data required for the execution of the techniques described herein and for storing computer program code for causing the processing unit 12 to perform method steps as described in more detail below.

The processing unit 12 can be implemented in numerous ways, with software and/or hardware, to perform the various functions described herein. The processing unit 12 may comprise one or more microprocessors or digital signal processor (DSPs) that may be programmed using software or computer program code to perform the required functions and/or to control components of the processing unit 12 to effect the required functions. The processing unit 12 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

The memory unit 14 can comprise any type of non-transitory machine-readable medium, such as cache or system memory including volatile and non-volatile computer memory such as random access memory (RAM) static RAM (SRAM), dynamic RAM (DRAM), read-only memory (ROM), programmable ROM (PROM), erasable PROM (EPROM), and electrically erasable PROM (EEPROM).

Each client node 6 includes interface circuitry 16 for enabling a data connection to other devices, such as the server 4. In particular the interface circuitry 16 can enable a connection between the client node 6 and the network 8, such as the Internet, via any desirable wired or wireless communication protocol. The client node 6 further includes a processing unit 18 for performing operations on data and for generally controlling the operation of the client node 6. The client node 6 further includes a memory unit 20 for storing any data required for the execution of the techniques described herein and for storing computer program code for causing the processing unit 18 to perform method steps as described in more detail below.

The processing unit 18 and memory unit 20 can be implemented in numerous ways, similar to the processing unit 12 and memory unit 14 in the server 4.

In order to evaluate an event using a function, a current state of the function is required to be input, along with the event. The current state of the function contains all the information necessary to evaluate the event against a criterion or trigger condition given all previously-received events. The function takes the current state and the latest event and produces a new (updated) state and an indication of the result of the evaluation. The indication of the result of the evaluation may be, for example, an indication of whether the event meets some criteria or trigger condition, or an indication of the relationship between the event and previous events that have been evaluated, etc. As specific examples, the indication could be "the reported value (event) is outside the allowed bandwidth or range", or "the reported value (event) is not within one standard deviation of the mean of the last 1000 entries", to "the extrapolated prognosis over data reported in the last half year forecasts disaster for next year". For some functions, the indication of the result of the function can comprise multiple types of output. For example the function can output an indication of whether the new event meets the criteria or trigger condition, and if the new event does meet the criteria or trigger condition the function can also output a public output indicating the result (e.g. "the average systolic blood pressure has exceeded 120 mmHg", or a more detailed public output could be "the average systolic blood pressure over the last 10 measurements was 113 mmHg; the average diastolic blood pressure over the last 10 measurements was 93 mmHg"). The updated state of the function contains all the information necessary to evaluate the criteria or trigger condition for a subsequent event given all previously-received events (including the event that has been evaluated). The updated state is used as an input to the function for the evaluation of the next event. In some embodiments described herein the function is referred to as a monitoring function, the current state as the current monitoring state, the updated state as the updated monitoring state, and the indication of the result of the evaluation is an indication of whether the event meets the trigger condition and a public output (if the event meets the trigger condition).

In embodiments of the techniques presented herein, the server 4 monitors successive events until a trigger condition has been met. The events are measured, observed or obtained by a variety of client nodes 6 that are mutually distrusting, and thus do not share events with each other. The events are assumed to be available for evaluation by the server 4 one at a time.

The following description refers to certain elements or terms, which are generally defined below.

Event—An event is a quantifiable observation or measurement reported by one of the client nodes 6. In some embodiments, the event is sent to the server 4 in encrypted form. As an example, an event could be the most recent values for systolic and diastolic blood pressure for a patient.

Trigger condition—The trigger condition is a predicate P that models the condition that the system 2/server 4 is monitoring for. The trigger condition, or rather whether the trigger condition is satisfied, may be dependent on all previous events (which may be of the same type) input by all client nodes 6 into the system 2/server 4. The predicate evaluates to true when the trigger condition is met or satisfied, and to false under all other conditions. An example of a trigger condition is "The average systolic blood pressure over the last 10 measurements is more than 120 mmHg OR the average diastolic blood pressure over the last 10 measurements is more than 80 mmHg."

State—The state is a state S that contains information on previous events that have been evaluated. The state S contains all the information necessary to evaluate the trigger condition given all event updates received so far. In the techniques described herein, the state is 'distributed' in the sense that a party has a representation of the state S that it is unable to interpret or open without help from another party. The state S can therefore be considered as comprising two parts, a first part that is derived by one party (e.g. server 4) and a second part that is derived by another party (e.g. a client node 6). In the techniques described herein, one of the parts is a wire key representation of the state S that is derived by evaluating a garbled circuit, and the other part is the information that links the wire keys to the actual wire values (with the other party having generated those wire keys for the possible wire values). In addition, in the techniques described herein, as each of the server 4 and client node 6 generate a garbled circuit for the other party to evaluate and then evaluate a garbled circuit from the other party, each of the server 4 and client node 6 derive a respective wire key representation of the state S, and each has the information for the wire keys/wire values for the state derived by the other party.

Function—The function or monitoring function is a function F that evaluates the trigger condition predicate. Formally the function is a function that takes the current state S and the latest event $E_n$ as input and produces a new state S', and an indication of the result of the evaluation, for example a public bit t indicating whether a trigger condition is true (satisfied) and a public output o such that:

$$(t,o,S')=f(S,E_n) \quad (1)$$

where
{t=0, o=empty if $P(E_1, \ldots, E_n)$ is false
t=1, o=public output if $P(E_1, \ldots, E_n)$ is true.

Such a function is called an incremental computation. As described in more detail below, the function is evaluated using a privacy preserving computation, and in particular using garbled circuits. The public output o is public in the sense that it can indicate the result of the evaluation to the parties involved in the evaluation and/or other parties.

Server—The server 4 may receive new events from the client nodes 6, one at a time, in encrypted form, and then evaluate the monitoring function with the help of the client node 6 that provided the event. Based on the techniques described herein, the outputs t and o of this evaluation will be encrypted and the server 4 and client node 6 cooperate with each other to decrypt or translate the outputs t and o and make them public information (i.e. known to the server 4 and/or client node(s) 6, and/or known to other parties). In some embodiments, the server 4 stores part (i.e. a wire key representation) of the updated monitoring state S' that can be combined with information from a client node 6 to reconstruct the updated monitoring state S'. The server 4 can also store information for use by the client node 6 in reconstructing the updated monitoring state S' from a part (i.e. wire key representation) of the updated monitoring state S' derived by the client node 6.

Client node—A client node 6 measures or obtains the information in an event and submits it to the server 4. According to the techniques described herein, the client node 6 also performs an evaluation of the function to determine encrypted outputs t and o (i.e. wire key representations of outputs t and o), and the client node 6 cooperates with the server 4 to decrypt or translate them and make them public. There can be multiple client nodes 6 in the system 2, each of which independently submits events to the server 4. This can happen in any order; e.g. they can submit events according to a fixed schedule, or a client node 6 could submit many events before another client node 6 submits an event. It is assumed that the client nodes 6 communicate with the server 6 via a protected connection, i.e. they cannot learn each other's messages directly. An example of a client node 6 is the computer of a doctor or general practitioner (GP).

In this disclosure, 'evaluating' or 'monitoring' is considered as a repeated evaluation of the function F for every new event $E_n$, with the state S of the function F being a persistent state that is maintained between evaluations, with the server 4 keeping or retaining the state S (or rather the wire key representation of the state S) between events. The function is evaluated using privacy preserving computations (PPC), but such a computation requires at least two parties. Thus, every evaluation of the function is modelled as a two-party computation between the server 4 and the client node 6 that is submitting the latest event. In particular, each of the parties to the evaluation, e.g. the server 4 and the client node 6, garbles a circuit representing the function to be evaluated, and sends the garbled circuit to the other party for evaluation. In this two-party computation the client node 6 provides the event $E_n$ as a private input (i.e. an input that is kept secret or private from the other party in the computation), while the current state S, which is distributed between the client node 6 and the server 4, is re-used in the present evaluation. After computation, the server 4 will receive (a wire key representation of) the updated state S' as a private output (i.e. an output that is kept secret or private from the other party in the computation), and outputs t and o will be a public output (i.e. shared by the parties in the computation). For subsequent events, this process will repeat with the server 4 keeping the same role in the computation, but with a different client node 6 from event to event (namely the client node 6 that submitted the event).

Figure 2:
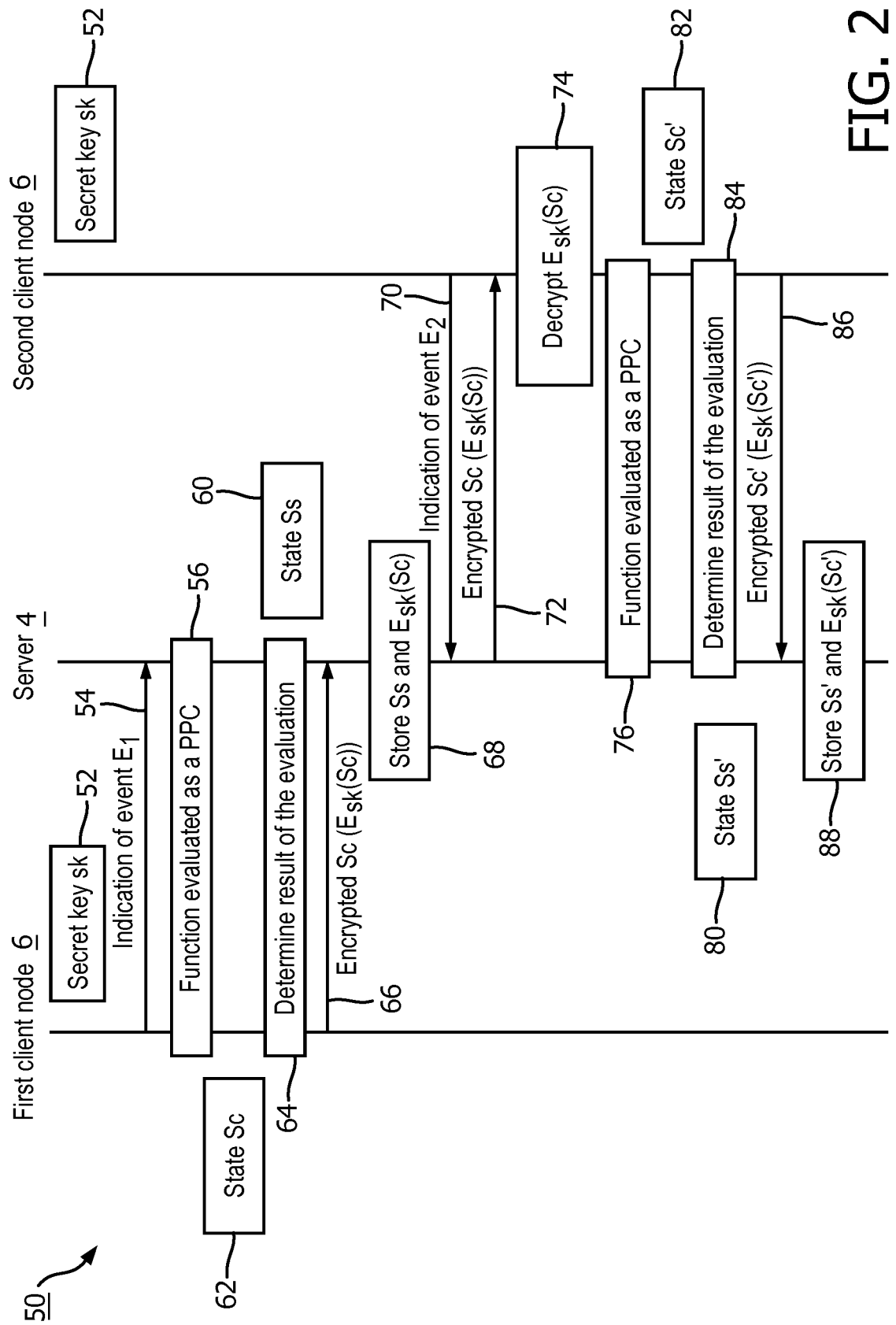
FIG. 2 is a signalling and flow diagram illustrating the operations of a server and two client nodes in evaluating a function as an incremental computation.

The signalling and flow diagram in FIG. 2 shows an exemplary way in which events can be evaluated by a function implemented as an incremental computation. In particular, FIG. 2 shows the information exchange and processing steps for a server 4 and a first client node 6 that submits a first event for evaluation, and the information exchange and processing steps for the server 4 and a second client node 6 that submits a second event for evaluation. As noted above, any type of node can perform any of the roles shown in FIG. 2.

In the implementation shown in FIG. 2, the main idea is that all consecutive executions of the function are performed as one big privacy preserving computation between the server 4 and a single hypothetical client node 6, with intermediate outputs after every event. This is considered as an 'incremental computation'. During this big computation both the server 4 and the client node 6 have a wire key representation of the state of the function F, respectively denoted Ss and Sc, and each of the server 4 and client node 6 have the information on the actual wire values represented by the wire keys representing the state held by the other party. In the following, references to "state Ss" or "state Sc" should be understood as referring to the wire key representation of the state S held by the server 4 and client node 6 respectively. Thus, the client node 6 has the information on the actual wire values represented by the wire keys representing the state Ss that the server 4 has, and vice versa. This big computation is broken up after every output, and the control of the computation is passed to the next client node 6 by passing over the client node's representation/part of the state Sc to the next client node 6. This passing over of control happens indirectly, with help from the server 4.

Firstly, it is assumed that all client nodes 6 have a shared secret key sk (box 52 in FIG. 2). The server 4 does not have or have access to this secret key sk. Each client node 6 can store the secret key in the memory unit 20.

A client node 6 can start the two-party protocol with the server 4. At the start, it is assumed that the function does not have a current state, so neither the server 4 nor client node 6 have a respective current state (or rather a respective wire key representation of a current state) in relation to the function to be evaluated.

Firstly, a first client node 6 measures, observes or obtains an event $E_1$. This event $E_1$ is private to the first client node 6 and so the first client node 6 does not send the event $E_1$ to the server 4 directly. Instead the first client node 6 indicates to the server 4 that an event is to be evaluated (signal 54).

Next, the server 4 and first client node 6 evaluate the function as a privacy-preserving computation (PPC)—step 56, with the first client node 6 inputting the event $E_1$. The PPC involves the exchange of information between the server 4 and the first client node 6, without the first client node 6 directly sharing the first event $E_1$ with the server 4.

As a result of the PPC, the server 4 and first client node 6 end up with their own state representations Sc and Ss respectively (as indicated by boxes 60 and 62 respectively). As noted in more detail below, these state parts/representations are such that the server 4 is unable to decrypt/translate Ss by itself, and the first client node 6 is unable to decrypt/translate Sc by itself. As such, neither the server 4 nor the first client node 6 knows the actual state of the function. The PPC of the function also results in outputs t and o that are encrypted (i.e. represented by wire keys) such that neither the server 4 nor the first client node 6 can decrypt or translate them without assistance from the other. As noted above, output t is an indication of whether the trigger condition is satisfied by the event $E_1$. If t=0 then output o will be empty. The server 4 and the first client node 6 therefore cooperate with each other to determine the result of the evaluation (box 64).

So that control of the computation can be passed by the server 4 to the next client node 6 to submit an event for evaluation, the first client node 6 encrypts their local state part Sc of the state S using the secret key sk 52, resulting in $E_{sk}$(Sc), and sends this to the server 4 (signal 66). The server 4 stores both Ss (the representation of the distributed state S of the function as determined by the server 4 in the PPC) and $E_{sk}$(Sc) in a memory unit 14 (step 68). Since the server 4 does not know the secret key sk 52, the server 4 is not able to decrypt $E_{sk}$(Sc) to learn the wire key representation Sc of the state S, which keeps the security of the protocol intact.

When another client node 6 (or even the first client node 6) has another event to evaluate, that client node 6 can continue the two-party protocol with the server 4 as follows. Thus, a second client node 6 has an event $E_2$ that has been measured, observed or obtained by the second client node 6. This event $E_2$ is private to the second client node 6 and so the second client node 6 does not send the event $E_2$ to the server 4 directly. Instead the second client node 6 indicates to the server 4 that an event is to be evaluated (signal 70).

The server 4 sends the encrypted client state representation $E_{sk}$(Sc) stored in the memory unit 14 to the second client node 6 (signal 72). Since the second client node 6 knows shared secret key sk 52, the second client node 6 decrypts $E_{sk}$(Sc) using the secret key sk 52 to find the current state part/representation Sc of the function at the client nodes (step 74).

The server 4 and the second client node 6 then resume the privacy preserving computation to evaluate the second event $E_2$ according to the function (step 76). The second client node 6 inputs the event $E_2$ and the current state representation Sc of the function at the client node (without directly sharing the event $E_2$ and current state representation Sc with the server 4), and the server 4 inputs the current state representation Ss of the function at the server 4 (without directly sharing the current state representation Ss with the second client node 6).

The privacy preserving computation of the function results in outputs t and o, that are distributed such that neither the server 4 nor the second client node 6 can translate them without assistance from the other. These outputs are distributed in the same sense as the state S. That is, one party has a wire key representation of the output(s), and the other party has information on the actual wire values represented by the wire keys. The server 4 and the second client node 6 therefore cooperate with each other to determine the result of the evaluation (signal 84). The server 4 and the second client node 6 end up with their own updated state representations Ss' and Sc' respectively of an updated state S' (boxes 80 and 82 respectively). As noted in more detail below (and similar to state S above), the updated state is distributed and the server 4 is unable to learn S' by itself from Ss', and the second client node 6 is unable to learn S' by itself from Sc'. As such, neither the server 4 nor the second client node 6 knows the actual state (or updated state) of the function.

Next, the second client node 6 encrypts the part/representation of the updated state Sc' using sk 52, resulting in $E_{sk}$(Sc'), and the second client node 6 sends $E_{sk}$(Sc') to the server 4 (signal 86). The server 4 stores both Ss' (the representation of the updated state of the function at the server 4) and the encrypted representation of the updated state Sc' of the function at the second client node 6 ($E_{sk}$(Sc')) in a memory unit 14 (step 88). Again, since the server 4 does not know the secret key sk 52, the server 4 is not able to learn the contents of the updated state representation Sc' (for which the server 4 knows the actual values represented by the wire keys), which keeps the security of the protocol intact.

As noted above, garbled circuits can be used to implement the privacy-preserving computation. Garbled circuits are an intrinsically asymmetric technique in which one party acts as the 'garbler' and sets up an encrypted binary circuit to compute a function F, and sends this to the other party. This 'garbled circuit' can be used to obliviously compute F, without the other party seeing the state during computation. The garbler's private input is already embedded in the circuit. Garbling can be done using, e.g., GaX which is described in "Efficient Garbling from a Fixed-Key Blockcipher" by Mihir Bellare et al., IACR Cryptology ePrint Archive 2013 (2013), p. 426. The other party acts as 'evaluator' to the circuit. To do this the other party needs to obtain from the garbler special keys related to his private input wires. These keys can be obtained using 1-out-of-2 oblivious transfer, for example as described in "The Simplest Protocol for Oblivious Transfer" by Tung Chou and Claudio Orlandi in Progress in Cryptology—LATINCRYPT 2015—4th International Conference on Cryptology and Information Security in Latin America, Guadalajara, Mexico, Aug. 23-26, 2015, Proceedings. The output of the circuit is either public to the evaluator, or consists of output wire keys that can be decoded by the garbler.

To implement the technique shown in FIG. 2 for evaluating a monitoring function using garbled circuits, there are two requirements. Firstly the triggering of the trigger condition should be identifiable, and secondly the state of one computation needs to be transferred to the next one.

These requirements can be met by having a series of garbled circuits, one for each event. Each of these circuits can have one easily recognisable output wire for output t, which will signal whether or not the trigger condition was satisfied. Triggering this condition can lead to the decryption of parts of the state as output o. The state between two computations is signified by a group of output wire keys that will be reused as input wire keys to the next computation. Between computations the garbler will keep all the output wire keys for both 0 and 1 wires as a state, without knowing which ones were evaluated. The evaluator will compute either the 0 or 1 wire keys during evaluation, without knowing what they signify, and keep them as a state. On the next computation the evaluator will use these wire keys as input wires, without needing to do an oblivious transfer (OT).

Where garbled circuits are used, either the server 4 or the current client node 6 can act as the garbler. In either case, the client node 6 has a state that must be passed on to the next client node 6.

As noted above, with the above implementation of the PPC, provided that each of the clients and server involved in the various evaluations of the monitoring function operate faithfully, then privacy of the inputs can be preserved and authenticity of the determined output assured. However, this is not always a reasonable assumption, especially in the monitoring setting where it is expected that a large number of different clients, who do not all know each other, cooperate. In such a setting, where the server and multiple clients do not necessarily trust each other to perform the protocols faithfully, there are at least two desirable characteristics. The first is that each client should be sure that no information about its inputs leaks to any (combination of) other parties, except as implied by the state of the monitoring function, and the second is that neither any client nor the server by itself should be able to manipulate the state update operation so that an incorrect result is produced.

To achieve these characteristics, the techniques described herein provide that the function is evaluated twice: once with the circuit being garbled by the server and evaluated by the client, and once with the circuit being garbled by the client and evaluated by the server. The server and client can then cooperate to determine the result of the evaluation.

Figure 3:
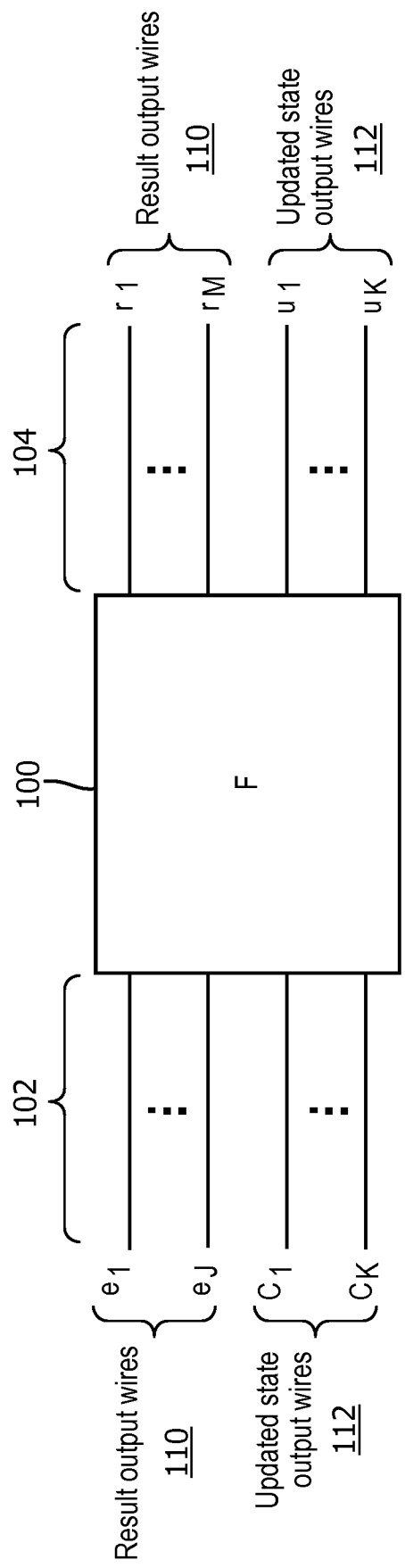
FIG. 3 is an illustration of a circuit representing a function to be evaluated.

FIG. 3 is an illustration of a circuit 100 representing a function to be evaluated. The function F that is to be evaluated can be represented by a circuit 100 that includes one or more logic operations, such as Boolean logic operations and operations such as adding, subtracting, multiplying, dividing, etc. Therefore, the circuit 100 can include one or more logic gates (e.g. AND, OR, NOT, etc.) and/or combinations thereof. The circuit 100 has a plurality of input wires 102 for enabling the information that is to be input to the function to be input to the circuit 100. The circuit 100 also has a plurality of output wires 104 for enabling the information that is to be generated and output by the function to be output from the circuit 100. Each wire in the plurality of input wires 102 is for inputting a single bit into the circuit 100 (so a binary 1 or 0). Likewise, each wire in the plurality of output wires 104 is for outputting a single bit from the circuit 100 (so a binary 1 or 0).

The plurality of input wires 102 comprises one or more event input wires 106 for inputting an event (e.g. a measurement of a physiological characteristic such as blood pressure) into the circuit 100. The number of event input wires 106 in the circuit 100 will depend on the number of bits used to represent the event. For example, if the event can be represented as a 16-bit value, the circuit 100 with include 16 event input wires 106, one for each bit of the event. FIG. 3 shows J event input wires 106 (labelled $e_1$ to $e_J$), where J is any integer greater than 0.

The plurality of input wires 102 also comprises one or more current state input wires 108 for inputting the current state of the function into the circuit 100. FIG. 3 shows K current state input wires 108 (labelled $c_1$ to $c_K$), where K is any integer greater than 0. As noted above, the current state of the function contains all the information necessary to evaluate a new event against a criteria or trigger condition given all previously-received events, without having to re-input those previous events into the circuit 100.

The plurality of output wires 104 comprises one or more result output wires 110 for outputting the result of the evaluation of the function from the circuit 100. The number of result output wires 110 will depend on the number of bits used to represent the result of the evaluation. FIG. 3 shows M result output wires 110 (labelled $r_1$ to $r_M$), where M is any integer greater than 0. In some embodiments, the result output from the function (and thus circuit 100) includes an indication of whether a trigger condition has been met by the evaluated event. This indication may be a single bit (e.g. a '0' indicating that the trigger condition is not met, and a '1' indicating that the trigger condition is met), in which case there may be a single result output wire 110. However, it will be appreciated that the indication of whether a trigger condition has been met may be represented by a plurality of bits, in which case there may be a plurality of result output wires 110. In some embodiments, the result output from the function includes a public output indicating the result of the evaluation (e.g. "the average systolic blood pressure has exceeded 120 mmHg"). This public output is typically represented by a plurality of bits, in which case there may be a plurality of result output wires 110 for outputting the public output. In some embodiments, the result output from the function can include both an indication of whether a trigger condition has been met, and a public output, in which case there are one or more result output wires 110 for each of the trigger condition and the public output. Depending on the particular function, the public output may be empty or 0 unless the trigger condition has been met by the evaluated event.

The plurality of output wires 104 also comprises one or more updated state output wires 112 for outputting the updated state of the function from the circuit 100. FIG. 3 shows K updated state output wires 112 (labelled $u_1$ to $u_K$), so the same number of wires as the current state input wires 108 used for inputting the current state where K. The updated state of the function contains all the information necessary to evaluate the next new event against a criteria or trigger condition given all previously-received events, including the event just evaluated, without having to re-input those previous events into the circuit 100.

When the circuit 100 is garbled by a node (e.g. a server 4 or a client node 6), the node generates a pair of wire keys for each of the input wires 102 and each of the output wires 104 (and indeed for any intermediate wires within the circuit 100, e.g. that link the logic functions in the circuit 100 together), with one of the wire keys in each pair representing a '0' bit on that wire and the other one of the wire keys in each pair representing a '1' bit on that wire. A wire key is typically a randomly generated string of bits (e.g. a wire key can replace a binary '0' or '1' with a random bit string (e.g. comprising 128 bits). Then, all of the '0's and '1's in the truth tables for the logic function(s) in the circuit 100 are replaced with the appropriate wire key for that wire and bit value. Each output value in each truth table is then encrypted using the wire keys for the inputs that provide that value. For example for two input wires G and H and an output wire Z, a '0' output for wire Z that is produced by a '1' input on wire G and a '0' input on wire H will be represented by $\text{Enc}_{X_G^1 X_H^0}(X_Z^0)$, where $X_Y^X$ is the wire key for wire Y and bit value x. The encrypted outputs in the truth tables are then randomly permuted to generate a 'garbled table'.

The garbled tables for each of the logic operations in the circuit 100 can be shared with another node for evaluation, along with one or more wire keys for an input from the node that garbled the circuit 100 (e.g. an event), and, if required, one or more wire keys for an input to the circuit 100 that is provided by the other node (e.g. a current state of the function). The other node can then attempt to decrypt the rows in each garbled table using the received wire keys. The received wire keys will enable the node to decrypt one row per table (corresponding to the input values associated with those wire keys), and thus find an output value(s) for the circuit 100. This output value is a wire key per output wire 104, but without knowledge of what the wire keys represent, it is not possible for the node that evaluated the garbled circuit to determine the actual output of the circuit 100. Thus the node must cooperate with the node that garbled the circuit 100 to 'decrypt' the output of the garbled circuit.

In the context of a function that is implemented as an incremental computation as described above, the garbler will keep all the wire keys for both 0 and 1 values of the updated state output wires 112 as a state, without knowing which ones were determined by the evaluator. The evaluator will compute either the 0 or 1 wire keys for the updated state during evaluation, without knowing what they signify, and keep them as a state. On the next computation (i.e. next evaluation of an event) the garbler will use the 0 and 1 wire keys for the updated state output wires 112 as current state input wires 108, and the evaluator will use the 0 or 1 wire keys for the updated state as the state input wires 108, without needing to do an oblivious transfer (OT) to obtain the wire keys for that current state.

As an alternative to the above, it will be appreciated that the circuit 100 may have one or more wires (input and/or output) 102, 104 that can represent or have any number of values, i.e. not just a 0-bit and/or a 1-bit, but a range of values or a set of values (and specifically more than two possible values). In this case, when garbling the circuit 100, a respective wire key is generated for each possible value of each input wire 102 and each output wire 104. Thus, each wire (input and output) 102, 104 has an associated subset of wire keys, with each wire key in the subset representing a possible value for the wire. For simplicity, in the following description of the techniques presented herein, the input wire(s) 102 and output wire(s) 104 of the circuit 100 are assumed to only have or only use 0-bit and 1-bit values, but it will be appreciated that all the following techniques can also be applied to circuits 100 for which the input wire(s) 102 and/or output wire(s) 104 can have different (and/or more) values. In embodiments where each wire can represent any number of values, wire keys for a particular wire can be generated from a first wire key, e.g. k0, and an offset value R, with the wire key for value i being generated from, for example, k0+i*R.

As noted above, in accordance with the techniques described herein, dual execution is used to evaluate the function in steps 56 and 76 of FIG. 2, so each of the two parties to the PPC (e.g. a server and a first client node 6) respectively garble the circuit 100 and send it to the other for evaluation.

Briefly, dual execution is applied to the technique in FIG. 2 as follows. Initially, a client node 6 holds 0/1 wire keys $s_i^0$, $s_i^1$ for each ith state bit and the server 4 holds a wire key $s_i \in \{s_i^0, s_i^1\}$ for each ith state bit. Symmetrically, the server 4 holds 0/1 wire keys $t_i^0$, $t_i^1$ for each ith state bit and the client node 6 holds wire key $t_i \in \{t_i^0, t_i^1\}$ for each ith state bit.

Then, the client node 6 and server 4 compute F using garbled circuits. The client node 6 garbles the circuit (using wire keys $s_i^0$, $s_i^1$ for the current state input wires 108) and the server 4 evaluates it (using wire keys $s_i$ for the state and obtaining the client node's wire input keys from the client node 6). The client node 6 learns $S_i^0$, $S_i^1$, $G^0$, $G^1$, $O_i^0$, $O_i^1$, wire keys for the state, trigger, and public output wires, while the server 4 learns the wire keys $S_i$, $G$, $O_i$ corresponding to the actual values. Correspondingly, the server 4 garbles the circuit (using wire keys $t_i^0$, $t_i^1$ for the current state input wires 108) and the client node 6 evaluates it (using wire keys $t_i$ for the state, obtaining its wire input keys using actively secure OT). The server 4 learns $T_i^0$, $T_i^1$, $H^0$, $H^1$, $P_i^0$, $P_i^1$, wire keys for the state, trigger, and public output wires, while the client node 6 learns the wire keys $T_i$, $H$, $P_i$ corresponding to the actual values. The server 4 and the client node 6 can then cooperate to determine the actual values of the trigger and public output.

Figure 4I:
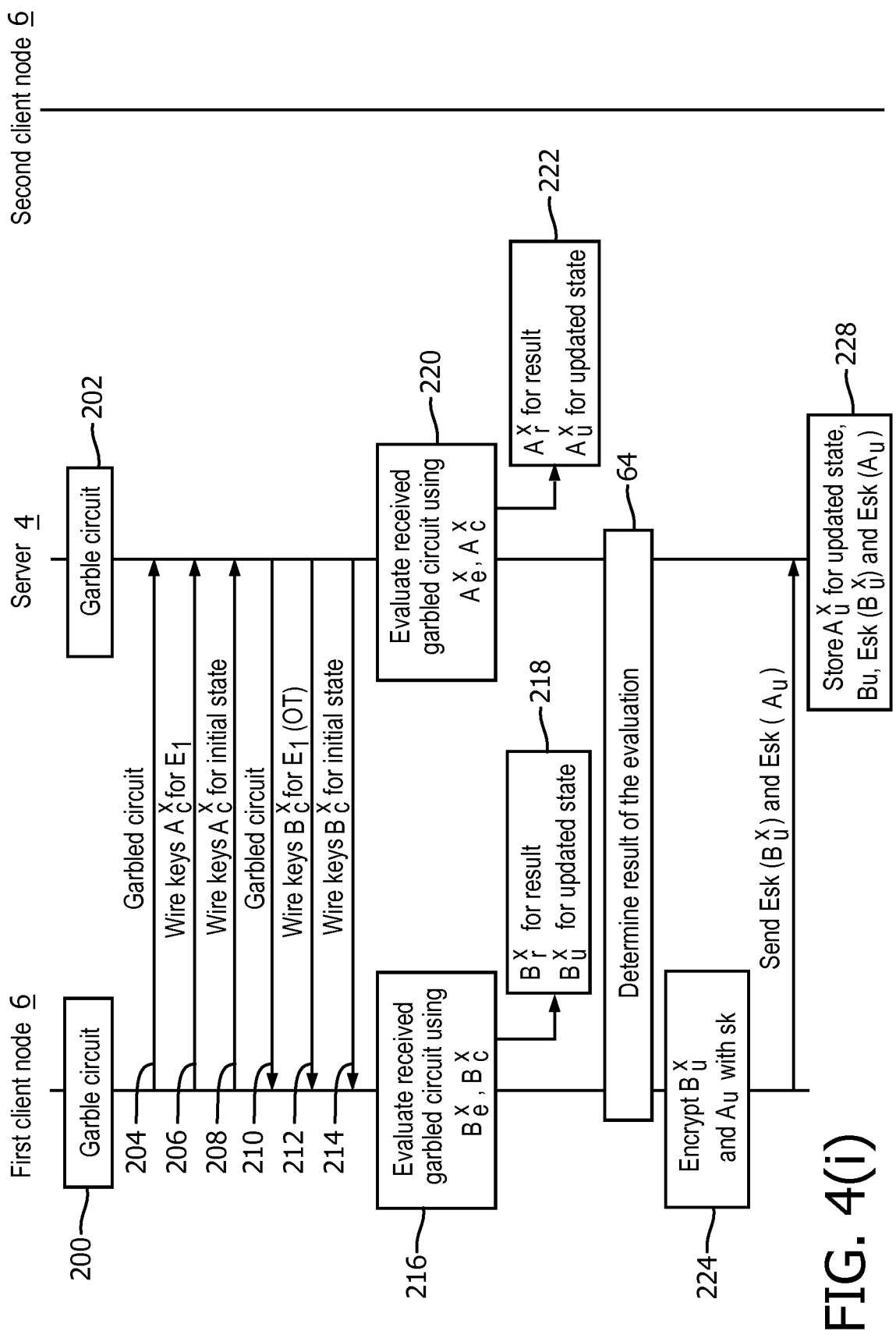
FIGS. 4(i) and 4(ii) is a signalling and flow diagram illustrating the operations of a server and two client nodes in evaluating a function using garbled circuits according to an embodiment.
Figure 4:
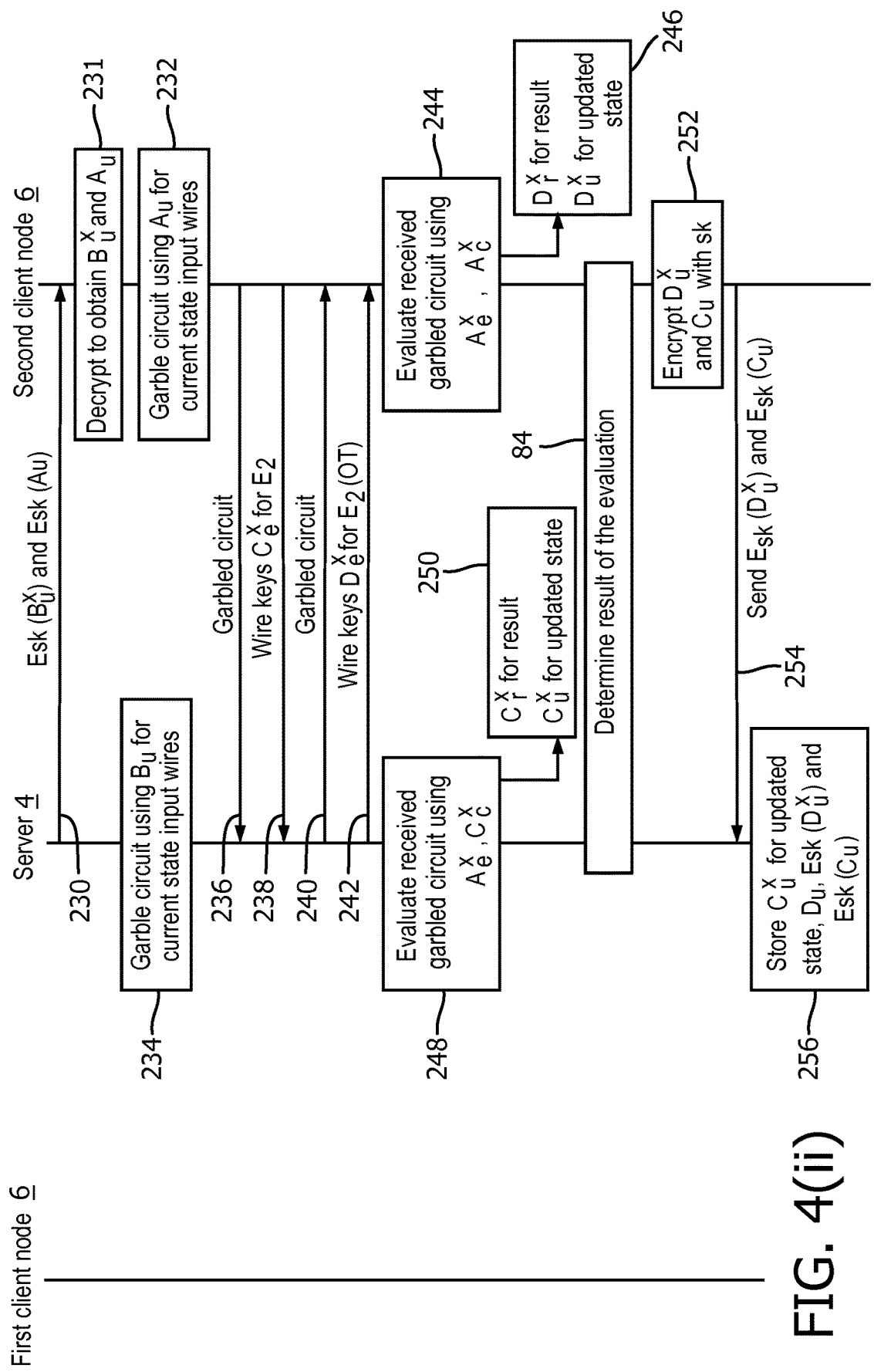

The signalling and flow diagram in FIG. 4 shows in more detail how the concept of dual execution can be applied to the first evaluation of a function by a first client node 6 and a server 4 as shown in step 56 of FIG. 2 and a second evaluation of a function by a second client node 6 and a server 4 as shown in step 76 of FIG. 2. In particular, steps and signals 200-222 of FIG. 4 correspond to step 56 of FIG. 2 and steps 232-250 of FIG. 4 correspond to step 76 of FIG. 2. It will be appreciated that although the concept of dual execution is illustrated as being between a server 4 and a client node 6, dual execution could also be used between two servers 4, or between two client nodes 6, or more generally between any two nodes 4, 6.

Thus, following the sending of an indication 54 from the first client node 6 to the server 4 that there is an event $E_1$ to be evaluated, the first client node 6 garbles the circuit 100 to form a garbled circuit that is referred to as a client-garbled circuit (step 200). This evaluation of the function F is assumed to be the first evaluation of the function, and so no existing wire keys and no current state of the function are available for the circuit 100.

Thus, to garble the circuit 100, the first client node 6 generates a pair of wire keys for each of the input wires 102 and each of the output wires 104 (and indeed for any intermediate wires within the circuit 100, e.g. that link the logic functions in the circuit 100 together), with one of the wire keys in each pair representing a '0' bit on that wire and the other one of the wire keys in each pair representing a '1' bit on that wire.

Figures 5, 6:
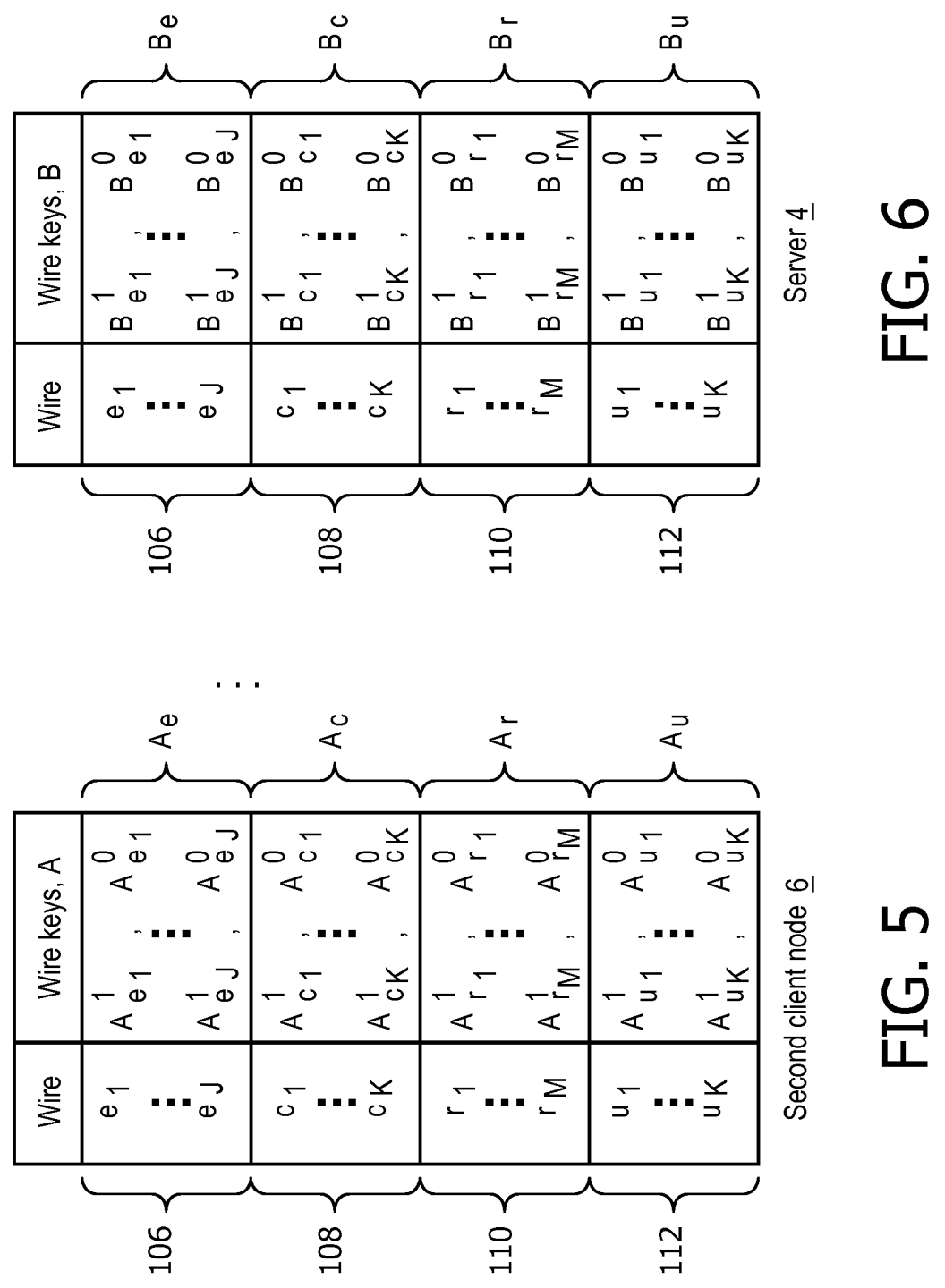

The table in FIG. 5 shows the notation used for the wire keys generated by the first client node 6 for each of the input wires 102 and each of the output wires 104. Thus, each event input wire 106 $e_j$ (where $1 \leq j \leq J$, with J being an integer equal to or greater than 1) has a respective pair of wire keys $A_{e_j}^1$, $A_{e_j}^0$, with $A_{e_j}^1$ being the wire key for the jth event input wire 106 representing a 1-bit, and $A_{e_j}^0$ being the wire key for the jth event input wire 106 representing a 0-bit. The respective pair of wire keys for each of the event input wires 106 can be collectively referred to as a set of wire keys for the event input wires 106, and can be generally denoted $A_e$.

Each current state input wire 108 $c_k$ (where $1 \leq k \leq K$, with K being an integer equal to or greater than 1) has a respective pair of wire keys $A_{c_k}^1$, $A_{c_k}^0$, with $A_{c_k}^1$ being the wire key for the kth current state input wire 108 representing a 1-bit, and $A_{c_k}^0$ being the wire key for the kth current state input wire 108 representing a 0-bit. The respective pair of wire keys for each of the current state input wires 108 can be collectively referred to as a set of wire keys for the current state input wires 108, and can be generally denoted $A_c$.

Each result output wire 110 $r_m$ (where $1 \leq m \leq M$, with M being an integer equal to or greater than 1) has a respective pair of wire keys $A_{r_m}^1$, $A_{r_m}^0$, with $A_{r_m}^1$ being the wire key for the mth result output wire 110 representing a 1-bit, and $A_{r_m}^0$ being the wire key for the mth result output wire 110 representing a 0-bit. The respective pair of wire keys for each of the result output wires 110 can be collectively referred to as a set of wire keys for the result output input wires 110, and can be generally denoted $A_r$.

Each updated state output wire 112 $u_k$ (where $1 \leq k \leq K$, with K being an integer equal to or greater than 1, i.e. the same number of wires as the current state input wires 108) has a respective pair of wire keys $A_{u_k}^1$, $A_{u_k}^0$, with $A_{u_k}^1$ being the wire key for the kth updated state output wire 112 representing a 1-bit, and $A_{u_k}^0$ being the wire key for the kth updated state output wire 112 representing a 0-bit. The respective pair of wire keys for each of the updated state output wires 112 can be collectively referred to as a set of wire keys for the updated state output wires 112, and can be generally denoted $A_u$. For completeness, it should be noted that the wire keys $A_c$ are different from the wire keys $A_u$.

The server 4 also garbles the circuit 100 to form a garbled circuit that is referred to as a server-garbled circuit (step 202). Step 202 can occur at the same or a similar time to step 200 performed by the first client node 6.

Thus, to garble the circuit 100, the server 4 generates a pair of wire keys for each of the input wires 102 and each of the output wires 104 (and indeed for any intermediate wires within the circuit 100, e.g. that link the logic functions in the circuit 100 together), with one of the wire keys in each pair representing a '0' bit on that wire and the other one of the wire keys in each pair representing a '1' bit on that wire. Since the wire keys are typically random bit strings, the wire keys generated by the server 4 will be different to the wire keys generated by the first client node 6.

The table in FIG. 6 shows the notation used for the wire keys generated by the server 4 for each of the input wires 102 and each of the output wires 104. Thus, each event input wire 106 $e_j$ has a respective pair of wire keys $B_{e_j}^1$, $B_{e_j}^0$, with $B_{e_j}^1$ being the wire key for the jth event input wire 106 representing a 1-bit, and $B_{e_j}^0$ being the wire key for the jth event input wire 106 representing a 0-bit. The respective pair of wire keys for each of the event input wires 106 can be collectively referred to as a set of wire keys for the event input wires 106, and can be generally denoted $B_e$.

Each current state input wire 108 $c_k$ has a respective pair of wire keys $B_{c_k}^1$, $B_{c_k}^0$, with $B_{c_k}^1$ being the wire key for the kth current state input wire 108 representing a 1-bit, and $B_{c_k}^0$ being the wire key for the kth current state input wire 108 representing a 0-bit. The respective pair of wire keys for each of the current state input wires 108 can be collectively referred to as a set of wire keys for the current state input wires 108, and can be generally denoted $B_c$.

Each result output wire 110 $r_m$ has a respective pair of wire keys $B_{r_m}^1$, $B_{r_m}^0$, with $B_{r_m}^1$ being the wire key for the mth result output wire 110 representing a 1-bit, and $B_{r_m}^0$ being the wire key for the mth result output wire 110 representing a 0-bit. The respective pair of wire keys for each of the result output wires 110 can be collectively referred to as a set of wire keys for the result output input wires 110, and can be generally denoted $B_r$.

Each updated state output wire 112 $u_k$ has a respective pair of wire keys $B_{u_k}^1$, $B_{u_k}^0$, with $B_{u_k}^1$ being the wire key for the kth updated state output wire 112 representing a 1-bit, and $B_{u_k}^0$ being the wire key for the kth updated state output wire 112 representing a 0-bit. The respective pair of wire keys for each of the updated state output wires 112 can be collectively referred to as a set of wire keys for the updated state output wires 112, and can be generally denoted $B_u$. For completeness, it should be noted that the wire keys $B_c$ are different from the wire keys $B_u$.

Next, the first client node 6 sends a representation of the client-garbled circuit to the server 4 (signal 204). The representation of the client-garbled circuit can be the garbled truth tables for each of the logic operations in the circuit 100.

The first client node 6 also sends wire keys representing the event to be evaluated (i.e. event $E_1$) to the server 4 (signal 206). That is, the first client node 6 identifies the appropriate wire key in each pair $A_{e_j}^1$, $A_{e_j}^0$ for each event input wire 106 corresponding to the bit values forming the event $E_1$ and sends these to the server 4. This set of wire keys representing a specific event is denoted $A_e^X$. Consider an example where there are four event input wires 106, meaning that each event is represented by a 4-bit value, with an exemplary event having a value of 1011. The wire keys $A_e^X$ representing this event will therefore be $A_{e_4}^1$, $A_{e_3}^0$, $A_{e_2}^1$, $A_{e_1}^1$, and these wire keys are sent to the server 4 (signal 206). The sending of these wire keys to the server 4 enables the server 4 to input the event $E_1$ into the client-garbled circuit. However, since the server 4 does not know the relationship between the wire keys $A_e^X$ and the bits they represent (i.e. the server 4 does not know whether any given wire key (random bit string) is a '0' or a '1'), the server 4 does not learn what the event $E_1$ is, and thus the event $E_1$ remains private to the first client node 6.

As this is the first evaluation of the function, the server 4 does not have an initial state for the function, so the first client node 6 also sends wire keys representing an initial state to the server 4 (signal 208). The initial state can be a default state or a null state, for example. Similar to the wire keys $A_e^X$ for the event $E_1$, the first client node 6 identifies the appropriate wire key in each pair $A_{c_k}^1$, $A_{c_k}^0$ for each current state input wire 108 corresponding to the bit values forming the initial state and sends these to the server 4. This set of wire keys representing a specific current state is denoted $A_c^X$.

The server 4 also sends a representation of the server-garbled circuit to the first client node 6 (signal 210). The representation of the server-garbled circuit can be the garbled truth tables for each of the logic operations in the circuit 100.

The server 4 also needs to send the wire keys for the event $E_1$ to the first client node 6 so that the first client node 6 can input the event $E_1$ into the server-garbled circuit.

However, the event $E_1$ is a private input of the first client node 6 and so it should not be shared directly with the server 4. Therefore, oblivious transfer (OT) can be used to enable the first client node 6 to obtain the wire keys for the event $E_1$ from the server 4, without the server 4 learning the event $E_1$ (i.e. without learning which wire keys in the set $B_e$ have been sent to the first client node 6). This set of wire keys from the set $B_e$ representing a specific event is denoted $B_e^X$. In some embodiments, the wire keys for the event $E_1$ can be obtained using a 1-out-of-2 oblivious transfer, for example as described in "The Simplest Protocol for Oblivious Transfer" by Tung Chou and Claudio Orlandi in Progress in Cryptology—LATINCRYPT 2015—4th International Conference on Cryptology and Information Security in Latin America, Guadalajara, Mexico, Aug. 23-26, 2015, Proceedings.

Signal 212 in FIG. 4 shows the relevant wire keys $B_e^X$ from the set $B_e$ for the event $E_1$ being sent to the first client node 6, but it will be appreciated that there may be other signalling between the first client node 6 and the server 4 to complete the OT that is not shown in FIG. 4.

As this is the first evaluation of the function, the first client node 6 does not have an initial state for the function, so the server 4 also sends wire keys representing an initial state to the first client node 6 (signal 214). The initial state can be a default state or a null state, for example. The server 4 can simply identify the appropriate wire key in each pair $B_{c_k}^1$, $B_{c_k}^0$ for each current state input wire 108 corresponding to the bit values forming the initial state and send these to the first client node 6 (signal 214). This set of wire keys representing a specific current state is denoted $B_c^X$.

Then, in step 216, the first client node 6 evaluates the representation of the server-garbled circuit. That is, the first client node 6 attempts to decrypt the rows in each garbled table in the representation using the received wire keys $B_e^X$ from the set $B_e$ representing the event $E_1$ (as sent in signal 212) and the received wire keys $B_c^X$ from the set $B_c$ representing the current (initial) state (as sent in signal 214). The received wire keys will only enable the first client node 6 to decrypt one row per table (corresponding to the input values associated with those wire keys), and thus ultimately find the output of the circuit 100 in the form of a wire key from $B_r$ for each result output wire 110 and a wire key from $B_u$ for each updated state output wire 112 (as shown in step 218). The set of wire keys from $B_r$ representing the evaluation result is denoted $B_r^X$. The set of wire keys from $B_u$ representing the updated state is denoted $B_u^X$. This updated state $B_u^X$ corresponds to state Sc in block 62 of FIG. 2. As the first client node 6 does not know which bit value each of these wire keys in $B_u^X$ represents, the first client node 6 does not know at this stage what the updated state of the function is, or what the result of the evaluation is.

In step 220, which can occur at the same or a similar time to step 216, the server 4 evaluates the representation of the client-garbled circuit. That is, the server 4 attempts to decrypt the rows in each garbled table in the representation using the received wire keys $A_e^X$ from the set $A_e$ representing the event $E_1$ (as sent in signal 206) and the received wire keys $A_c^X$ from the set $A_c$ representing the current (initial) state (as sent in signal 208). The received wire keys will only enable the server 4 to decrypt one row per table (corresponding to the input values associated with those wire keys), and thus ultimately find the output of the circuit 100 in the form of a wire key from $A_r$ for each result output wire 110 and a wire key from $A_u$ for each updated state output wire 112 (as shown in step 222). The set of wire keys from $A_r$ representing the evaluation result is denoted $A_r^X$. The set of wire keys from $A_u$ representing the updated state is denoted $A_u^X$. This updated state $A_u^X$ corresponds to state Ss in block 60 of FIG. 2. As the server 4 does not know which bit value each of these wire keys represents, the server 4 does not know at this stage what the updated state of the function is, or what the result of the evaluation is.

Next, the first client node 6 and the server 4 cooperate to determine the result of the evaluation (step 64). This cooperation is described in more detail below.

Separate to the determination of the result of the evaluation, the first client node 6 encrypts the updated state $B_u^X$ using the secret key sk that is shared with other client nodes 6 (but not shared with the server 4), and also encrypts (using the secret key sk) the set of wire keys $A_u$ (and information on which of '0' and '1' each of the wire keys in $A_u$ represents) that the first client node 6 used for garbling the updated state output wires 112. This encryption is shown as step 224.

The first client node 6 then sends the encrypted $B_u^X$ and encrypted set of wire keys $A_u$ to the server 4 (shown as signal 226). This corresponds to signal 66 in FIG. 2.

The server 4 does not have or know the shared secret key sk, so the server 4 is unable to decrypt the received encrypted $B_u^X$ and encrypted set of wire keys $A_u$. The server 4 is therefore unable to determine $B_u^X$ and thus learn the updated state of the function as computed by the first client node 6, and is not able to determine $A_u$ which would enable the server 4 to determine the updated state of the function output by the server's evaluation of the client-garbled circuit.

The server 4 stores the received encrypted $B_u^X$ and encrypted set of wire keys $A_u$ (step 228, also corresponding to step 68 in FIG. 2). The server 4 also stores the updated state $A_u^X$ determined from the evaluation of the client-garbled circuit, and also the set of wire keys $B_u$ (and information on which of '0' and '1' each of the wire keys in $B_u$ represents) that the server 4 used for garbling the updated state output wires 112. This stored information is used the next time that an event is to be evaluated.

When a second client node 6 has an event $E_2$ to be evaluated, an indication 70 is sent from the second client node 6 to the server 4 indicating that there is an event $E_2$ to be evaluated using the function F. The server 4 retrieves the stored encrypted $B_u^X$ and encrypted set of wire keys $A_u$ that were received from the first client node 6 (or more generally that were received from the client node 6 that previously evaluated the function), and sends these to the second client node 6 (shown as signal 230 in FIG. 4, corresponding to signal 72 in FIG. 2).

The second client node 6 decrypts the received encrypted $B_u^X$ and encrypted set of wire keys $A_u$ using the shared secret key sk (which the second client node 6 has) to obtain $B_u^X$ and the set of wire keys $A_u$ that were used for the updated state output wires by the first client node 6 (step 231).

Next, the second client node 6 garbles the circuit 100 to form a garbled circuit. This garbled circuit is referred to as the client-garbled circuit (step 232). To garble the circuit 100, the second client node 6 uses the set of wire keys $A_u$ for the current state input wires 112, and generates a pair of wire keys for each of the event input wires 102 and each of the output wires 104 (and indeed for any intermediate wires within the circuit 100, e.g. that link the logic functions in the circuit 100 together). As before, one of the wire keys in each pair represents a '0' bit on that wire and the other one of the wire keys in each pair represents a '1' bit on that wire.

Using the set of wire keys $A_u$ for the current state input wires 112 enables the server 4 to input the updated state of the function $A_u^X$ that it stored following the previous evaluation of the function as the current state for the evaluation of the event $E_2$, without the server 4 or second client node 6 learning the content of the state.

The table in FIG. 7 shows the notation used for the wire keys generated by the second client node 6 for each of the input wires 102 and each of the output wires 104. Thus, each event input wire 106 $e_j$ has a respective pair of wire keys $C_{e_j}^1$, $C_{e_j}^0$, with $C_{e_j}^1$ being the wire key for the jth event input wire 106 representing a 1-bit, and $C_{e_j}^0$ being the wire key for the jth event input wire 106 representing a 0-bit. The respective pair of wire keys for each of the event input wires 106 can be collectively referred to as a set of wire keys for the event input wires 106, and can be generally denoted $C_e$.

As noted above, the current state input wires 108 have the wire keys $A_u$ used by the first client node 6 for garbling the updated state output wires 112 in the previous evaluation. In particular, each current state input wire 108 is assigned one of the respective pair of wire keys $A_{u_k}^1$, $A_{u_k}^0$, with $A_{u_k}^1$ being the wire key for the kth current state input wire 108 representing a 1-bit, and $A_{u_k}^0$ being the wire key for the kth current state input wire 108 representing a 0-bit. The respective pair of wire keys for each of the current state input wires 108 are collectively referred to as a set of wire keys for the current state input wires 108, and are generally denoted $A_u$.

Each result output wire 110 $r_m$ has a respective pair of wire keys $C_{r_m}^1$, $C_{r_m}^0$, with $C_{r_m}^1$ being the wire key for the mth result output wire 110 representing a 1-bit, and $A_{r_m}^0$ being the wire key for the mth result output wire 110 representing a 0-bit. The respective pair of wire keys for each of the result output wires 110 can be collectively referred to as a set of wire keys for the result output input wires 110, and can be generally denoted $C_r$.

Each updated state output wire 112 $u_k$ has a respective pair of wire keys $C_{1_k}^1$, $C_{u_k}^0$, with $C_{u_k}^1$ being the wire key for the kth updated state output wire 112 representing a 1-bit, and $C_{u_k}^0$ being the wire key for the kth updated state output wire 112 representing a 0-bit. The respective pair of wire keys for each of the updated state output wires 112 can be collectively referred to as a set of wire keys for the updated state output wires 112, and can be generally denoted $C_u$. For completeness, it should be noted that the wire keys $A_u$ used for the current state input wires 108 are different from the wire keys $C_u$ used for the updated state output wires 112.

The server 4 also garbles the circuit 100 to form a garbled circuit that is referred to as a server-garbled circuit (step 234). Step 234 can occur at the same or a similar time to step 232 performed by the second client node 6.

To garble the circuit 100, the server 4 uses the stored set of wire keys $B_u$ for the current state input wires 112, and generates a pair of wire keys for each of the event input wires 102 and each of the output wires 104 (and indeed for any intermediate wires within the circuit 100, e.g. that link the logic functions in the circuit 100 together).

Using the set of wire keys $B_u$ for the current state input wires 112 enables the second client node 6 to input the updated state of the function $B_u^X$ that it has received in signal 230 and decrypted in step 231 as the current state for the evaluation of the event $E_2$, without the server 4 or second client node 6 learning the content of the state.

The table in FIG. 8 shows the notation used for the wire keys generated by the server 4 for each of the input wires 102 and each of the output wires 104 in step 232. Thus, each event input wire 106 $e_j$ has a respective pair of wire keys $D_{e_j}^1, D_{e_j}^0$, with $N_{e_j}^1$ being the wire key for the jth event input wire 106 representing a 1-bit, and $D_{e_j}^0$ being the wire key for the jth event input wire 106 representing a 0-bit. The respective pair of wire keys for each of the event input wires 106 can be collectively referred to as a set of wire keys for the event input wires 106, and can be generally denoted $D_e$.

As noted above, the current state input wires 108 have the wire keys $B_u$ used by the server 4 for garbling the updated state output wires 112 in the previous evaluation. In particular, each current state input wire 108 is assigned one of the respective pair of wire keys $B_{u_k}^1, B_{u_k}^0$, with $B_{u_k}^1$ being the wire key for the kth current state input wire 108 representing a 1-bit, and $B_{u_k}^0$ being the wire key for the kth current state input wire 108 representing a 0-bit. The respective pair of wire keys for each of the current state input wires 108 are collectively referred to as a set of wire keys for the current state input wires 108, and are generally denoted $B_u$.

Each result output wire 110 $r_m$ has a respective pair of wire keys $D_{r_m}^1, D_{r_m}^0$, with $D_{r_m}^1$ being the wire key for the mth result output wire 110 representing a 1-bit, and $D_{r_m}^0$ being the wire key for the mth result output wire 110 representing a 0-bit. The respective pair of wire keys for each of the result output wires 110 can be collectively referred to as a set of wire keys for the result output input wires 110, and can be generally denoted $D_r$.

Each updated state output wire 112 $u_k$ has a respective pair of wire keys $D_{u_k}^1, D_{u_k}^0$, with $D_{u_k}^1$ being the wire key for the kth updated state output wire 112 representing a 1-bit, and $D_{u_k}^0$ being the wire key for the kth updated state output wire 112 representing a 0-bit. The respective pair of wire keys for each of the updated state output wires 112 can be collectively referred to as a set of wire keys for the updated state output wires 112, and can be generally denoted $D_u$. For completeness, it should be noted that the wire keys $B_u$ used for the current state input wires 108 are different from the wire keys $D_u$ used for the updated state output wires 112.

Next, the second client node 6 sends a representation of the client-garbled circuit to the server 4 (signal 236). The representation of the client-garbled circuit can be the garbled truth tables for each of the logic operations in the circuit 100.

The second client node 6 also sends wire keys representing the event to be evaluated (i.e. event $E_2$) to the server 4 (signal 238). That is, the second client node 6 identifies the appropriate wire key in each pair $C_{e_j}^1, C_{e_j}^0$ for each event input wire 106 corresponding to the bit values forming the event $E_2$ and sends these to the server 4. This set of wire keys representing a specific event is denoted $C_e^X$. The sending of these wire keys to the server 4 enables the server 4 to input the event $E_2$ into the client-garbled circuit. As in the first evaluation of the function above, since the server 4 does not know the relationship between the wire keys $C_e^X$ and the bits they represent (i.e. the server 4 does not know whether any given wire key (random bit string) is a '0' or a '1'), the server 4 does not learn what the event $E_2$ is, and thus the event $E_2$ remains private to the second client node 6.

As the server 4 already has a current state of the function represented by the appropriate wire keys (i.e. it is the stored updated state $A_u^X$ determined in step 220), and the current state input wires 108 use the same set of wire keys as the updated state output wires 112 that output the stored updated state $A_u^X$, there is no need in this evaluation of the function for the second client node 6 to send any wire keys for the current state of the function to the server 4.

The server 4 also sends a representation of the server-garbled circuit to the second client node 6 (signal 240). The representation of the server-garbled circuit can be the garbled truth tables for each of the logic operations in the circuit 100.

The server 4 also needs to send the wire keys for the event $E_2$ to the second client node 6 so that the second client node 6 can input the event $E_2$ into the server-garbled circuit. As with event $E_1$ in the first evaluation of the function, event $E_2$ is a private input of a client node 6 and so it should not be shared directly with the server 4. Therefore, OT is used to enable the second client node 6 to obtain the wire keys for the event $E_2$ from the server 4, without the server 4 learning the event $E_2$ (i.e. without learning which wire keys in the set $D_e$ have been sent to the second client node 6). This set of wire keys from the set $D_e$ representing a specific event is denoted $D_e^X$. In some embodiments, the wire keys for the event $E_2$ can be obtained using a 1-out-of-2 oblivious transfer.

Signal 242 in FIG. 4 shows the relevant wire keys $D_e^X$ from the set $D_e$ for the event $E_2$ being sent to the second client node 6, but it will be appreciated that there may be other signalling between the second client node 6 and the server 4 to complete the OT that is not shown in FIG. 4.

As the second client node 6 already has a current state of the function represented by the appropriate wire keys (i.e. it is the updated state $B_u^X$ decrypted in step 231), and the current state input wires 108 use the same set of wire keys as the updated state output wires 112 that output the updated state $B_u^X$, there is no need in this evaluation of the function for the server 4 to send any wire keys for the current state of the function to the second client node 6.

Then, in step 244, the second client node 6 evaluates the representation of the server-garbled circuit. That is, the second client node 6 attempts to decrypt the rows in each garbled table in the representation using the received wire keys $D_e^X$ from the set $D_e$ representing the event $E_1$ (as sent in signal 212) and the updated (now current) state $B_u^X$. The received wire keys $D_e^X$ and $B_u^X$ will only enable the second client node 6 to decrypt one row per table (corresponding to the input values associated with those wire keys), and thus ultimately find the output of the circuit 100 in the form of a wire key from $D_r$ for each result output wire 110 and a wire key from $D_u$ for each updated state output wire 112 (as shown in step 246). The set of wire keys from $D_r$ representing the evaluation result is denoted $D_r^X$. The set of wire keys from $D_u$ representing the updated state is denoted $D_u^X$. This updated state $D_u^X$ corresponds to state Sc' in block 82 of FIG. 2. As the second client node 6 does not know which bit value each of these wire keys represents, the second client node 6 does not know at this stage what the updated state of the function is, or what the result of the evaluation is.

In step 248, which can occur at the same or a similar time to step 244, the server 4 evaluates the representation of the client-garbled circuit. That is, the server 4 attempts to decrypt the rows in each garbled table in the representation using the received wire keys $C_e^X$ from the set $C_e$ representing the event $E_2$ (as sent in signal 238) and the wire keys $A_u^X$ from the set $A_u$ representing the previous updated (now current) state. The wire keys will only enable the server 4 to decrypt one row per table (corresponding to the input values associated with those wire keys), and thus ultimately find the output of the circuit 100 in the form of a wire key from $C_r$ for each result output wire 110 and a wire key from $C_u$ for each updated state output wire 112 (as shown in step 250). The set of wire keys from $C_r$ representing the evaluation result is denoted $C_r^X$. The set of wire keys from $C_u$ representing the updated state is denoted $C_u^X$. This updated state $C_u^X$ corresponds to state Ss' in block 80 of FIG. 2. As the server 4 does not know which bit value each of these wire keys represents, the server 4 does not know at this stage what the updated state of the function is, or what the result of the evaluation is.

Next, the second client node 6 and the server 4 cooperate to determine the result of the evaluation (step 84). This cooperation is described in more detail below.

Separate to the determination of the result of the evaluation, the second client node 6 encrypts the updated state $D_u^X$ using the secret key sk that is shared with other client nodes 6 (but not shared with the server 4), and also encrypts (using the secret key sk) the set of wire keys $C_u$ (and information on which of '0' and '1' each of the wire keys in $C_u$ represents) that the second client node 6 used for garbling the updated state output wires 112. This encryption is shown as step 252.

The second client node 6 then sends the encrypted $D_u^X$ and encrypted set of wire keys $C_u$ to the server 4 (shown as signal 254). This corresponds to signal 86 in FIG. 2.

The server 4 does not have or know the shared secret key sk, so the server 4 is unable to decrypt the received encrypted $D_u^X$ and encrypted set of wire keys $C_u$. The server 4 is therefore unable to determine $D_u^X$ and thus learn the updated state of the function as computed by the second client node 6, and is not able to determine $C_u$ which would enable the server 4 to determine the updated state of the function output by the server's evaluation of the client-garbled circuit.

The server 4 stores the received encrypted $D_u^X$ and encrypted set of wire keys $C_u$ (step 256, also corresponding to step 88 in FIG. 2). The server 4 also stores the updated state $C_u^X$ determined from the evaluation of the client-garbled circuit, and also the set of wire keys $D_u$ (and information on which of '0' and '1' each of the wire keys in $D_u$ represents) that the server 4 used for garbling the updated state output wires 112. This stored information is used the next time that an event is to be evaluated.

The procedure from signal 230 to step 256 is repeated for any subsequent evaluation of an event by the function.

After the evaluation the two garbled circuits in steps 216 and 220 in FIG. 4 (or after steps 244 and 248 in FIG. 4), the client-garbled circuit has been garbled by the client node 6 and evaluated by the server 4. For this garbled circuit, for each wire of the various outputs of the circuit 100 (updated state and result output, e.g. trigger and public output), the client node 6 has determined a pair of wire keys $K_0$ and $K_1$ representing bit values of 0 and 1 respectively, and the server 4 has determined a respective wire key K for each wire, where $K=K_0$ if that output bit has the value 0 and $K=K_1$ if that output bit has the value 1. Similarly, for the same function, a server-garbled circuit has been garbled by the server 4 and evaluated by the client node 6. For each of the same output wires above, the server 4 knows $L_0$ and $L_1$ representing bit values of 0 and 1 respectively, and the client node 6 has determined a respective wire key L for each wire, where $L=L_0$ if the output bit has the value 0 and $L=L_1$ if the output bit has the value 1.

Supposedly, the two garbled circuits are evaluations of the same circuit 100 on the same input values, so they should produce the same output values. In some embodiments, therefore, the cooperation between the nodes 4, 6 can include performing a check in order to verify that they have produced the same values. In some embodiments, this check can be performed while the outputs are still encrypted (i.e. before the wire keys output by the garbled circuits are translated to the actual wire values). This equality check can be performed on the state of the function after the evaluation (which is not output to the other node in the evaluation) and the indication of the result of the evaluation (before the result has been translated). An encrypted equality check is described in the "Quid-pro-quo-tocols: Strengthening semi-honest protocols with dual execution" paper, but as described herein, this check is applied not only to the result output wires $r_i$ of the evaluation of the garbled circuits, but also to the updated state output wires $u_i$ that are transferred from one computation/evaluation to the next. This checking of the consistency of the state has the effect of ensuring to a node that the state it passes on does not reveal any unintended information about its inputs.

In general, using the K and L wire key notation above, for a particular output wire of the circuit 100, the equality check aims to determine whether the following holds:

$$(K=K_0 \text{ AND } L=L_0) \text{ OR } (K=K_1 \text{ and } L=L_1)$$

i.e. it is determined whether both K and L represent value 0, or whether both K and L represent value 1. Garbled circuits have bits as inputs and outputs and in practice, keys $K/K_0/K_1$ and $L/L_0/L_1$ are bit strings of 128 bits each (e.g. due to the use of the Advanced Encryption Standard, AES), so in terms of bits, the above check could be written as $$(K_1=K_{0,1} \text{ AND } \ldots \text{ AND } K_{128}=K_{0,128} \text{ AND } L_1=L_{0,1}$$
$$\text{AND} \ldots \text{AND } L_{128}=L_{0,128}) \text{ OR } (K_1=K_{1,1}$$
$$\text{AND} \ldots \text{AND } K_{128}=K_{1,128} \text{ AND } L_1=L_{1,1}$$
$$\text{AND} \ldots \text{AND } L_{128}=L_{1,128})$$

A circuit that implements this check could have just one (binary) output wire, providing a 0 if the check failed (i.e. the outputs of the two garbled circuits did not match) and a 1 if the check succeeded (i.e. the outputs of the two garbled circuits did match).

The above check just deals with one output wire of circuit 100, so the check should be repeated for each output wire of circuit 100, with the results of all these checks AND'ed together to get one overall binary outcome.

Thus, more generally, to perform the equality check, the nodes 4, 6 perform another dual execution of a garbled circuit, but this time the circuit is a circuit that checks whether the output wire keys from the two executions above represent the same updated state and result outputs. Specifically, the circuit has inputs that are the wire keys of all the output wires 104 of the first dual execution (e.g. the wire keys for all the output wires generated by the first client node 6 in step 200 and the wire keys for all the output wires generated by the server 4 in step 202), and the output of the circuit is just one bit representing whether or not the evaluation of the client-garbled circuit and the server-garbled circuit provided the same computation output.

Using the first evaluation of the function described above with reference to FIG. 4 as an example, the inputs to the equality check by the first client node 6 will be: $A_{r_m}^1$, $A_{r_m}^0$ (the wire keys for the result output wires 110), $A_{u_k}^1$, $A_{u_k}^0$ (the wire keys for the updated state output wires 112), $B_r^X$ (the set of wire keys representing the evaluation result) and $B_u^X$ (the set of wire keys representing the updated state), and the inputs to the equality check by the server 4 will be: $B_{r_m}^1$, $B_{r_m}^0$ (the wire keys for the result output wires 110), $B_{u_k}^1$, $B_{u_k}^0$ (the wire keys for the updated state output wires 112), $A_r^X$ (the set of wire keys representing the evaluation result) and $A_u^X$ (the set of wire keys representing the updated state).

The circuit for performing the equality check evaluates the following Boolean formula:

$$\varphi := ((A_{u1}^x = A_{u1}^0 \wedge B_{u1}^x = B_{u1}^0) \vee \\ (A_{u1}^x = A_{u1}^1 \wedge B_{u1}^x = B_{u1}^1)) \wedge \ldots \\ \wedge ((A_{rM}^x = A_{rM}^0 \wedge B_{rM}^x = B_{rM}^0) \vee \\ (A_{rM}^x = A_{rM}^1 \wedge B_{rM}^x = B_{rM}^1))$$

where the Boolean formula $\varphi$ is a conjunction over all updated state and result output wires. Indeed, this Boolean formula checks for each output wire that the client node 6 outputs 1 if and only of the server 4 outputs 1; and that all outputs correctly correspond to a 0 or 1.

It will be appreciated that the use of dual execution to perform this equality check is merely one option, and for this check any generic protocol for secure 2-party computation that is secure against malicious adversaries can be used. For example, the technique described in "A New Approach to Practical Active-Secure Two-Party Computation" by Jesper Buus Nielsen et al., Advances in Cryptology—CRYPTO 2012 pp 681-700 can be used.

If the equality check indicates that the evaluations of the garbled circuits have provided different outputs (which could be the case even if just one of the output wire values is different) then the server 4 can consider the client node 6 to have acted maliciously and can prevent this client node 6 from providing further information or updates. The evaluation of the function can then proceed based on the state after the last successful state update/output.

Figure 9:
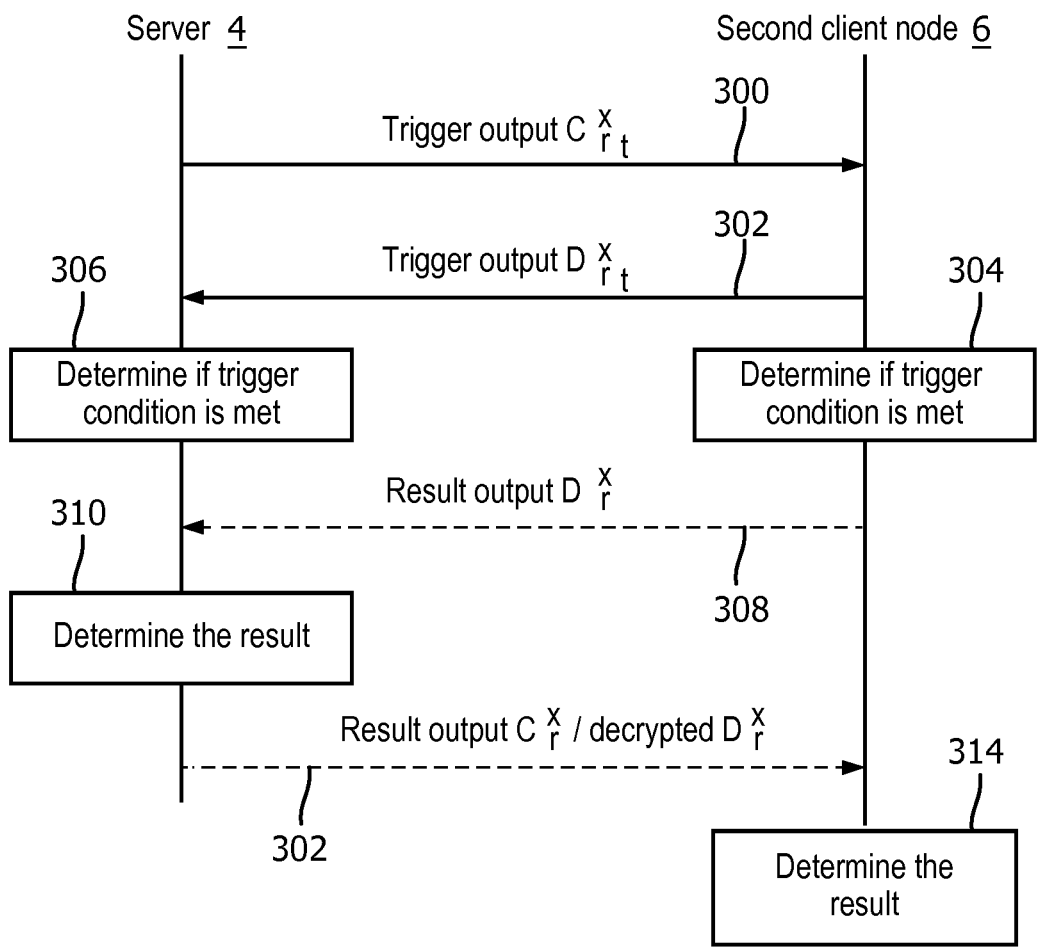
FIG. 9 is a flow chart illustrating a method of operating a node according to an embodiment.

If the equality check indicates that the evaluations of the garbled circuits have provided the same outputs (or if the equality check is omitted) then the nodes 4, 6 can cooperate to reveal the result of the evaluation (steps 64 and 84 in FIGS. 2 and 4). FIG. 9 is a flow and signalling diagram that shows an embodiment of a way in which the outputs can be revealed, which is applied to a circuit 100 that determines a trigger condition output and a public output that is to be revealed if the trigger condition is met. Thus, in these embodiments the result output wires 110 $r_m$ comprise one or more trigger output wires $r_t$ (where $1 \leq t \leq M$) and one or more public output output wires $r_p$ (where $1 \leq p \leq M$ and $p \neq t$).

In the exemplary embodiment, the wire key(s) for the trigger condition output wires $r_t$ output by each garbled circuit are sent to the other node 4, 6 for translation to the actual values, and if the trigger is set (i.e. the evaluated event meets the trigger condition), then one or both of the nodes 4, 6 can send the wire key(s) for the public output output wires $r_p$ to the other node 4, 6 for translation.

FIG. 9 shows how the server 4 and the second client node 6 cooperate to determine the result of the evaluation in step 84 of FIG. 4. Thus, following the evaluation of the garbled circuits, the server 4 sends (signal 300) the output of the trigger condition wire(s) $r_t$ to the second client node 6. This output is $C_{r_t}^X$. The second client node 6 sends (signal 302) the output of the trigger condition wire(s) $r_t$ to the server 4. This output is $D_{r_t}^X$.

The second client node 6 determines if the trigger condition has been met by comparing the received $C_{r_t}^X$ to the wire keys used for the trigger condition output wires (i.e. $C_{r_t}^1$, $C_{r_t}^0$) when the circuit 100 was garbled by the second client node 6 in step 232 (step 304). The server 4 determines if the trigger condition has been met by comparing the received $D_{r_t}^X$ to the wire keys used for the trigger condition output wires (i.e. $D_{r_t}^1$, $D_{r_t}^0$) when the circuit 100 was garbled by the server 4 in step 234 (step 306).

If in either of steps 304 or 306 the node 4, 6 determines that the received trigger condition output value does not match either of the trigger condition output wire keys, then an error has occurred and the results of the evaluation can be discarded.

If the second client node 6 determines that the trigger condition has been met, the second client node 6 can send the output of the public output wire(s) $r_p$ to the server 4 (signal 308). This output is $D_{r_p}^X$. Provided that the server 4 has also determined that the trigger condition has been met, then the server 4 determines the result of the evaluation (i.e. the public output) by comparing the received $D_{r_p}^X$ to the wire keys used for the public output output wires (i.e. $D_{r_p}^1$, $D_{r_p}^0$) when the circuit 100 was garbled by the server 4 in step 234 to determine the 1-bit or 0-bit values of the public output output wires (step 310). This public output can be shared by the server 4 to any relevant party, including the second client node 6. The server 4 may also share an indication that the trigger condition has been met.

As an alternative (or optionally in addition) to the above, if the server 4 determines that the trigger condition has been met, the server 4 can send the output of the public output wire(s) $r_p$ to the second client node 6 (signal 312). This output is $C_{r_p}^X$. Provided that the second client node 6 has also determined that the trigger condition has been met, then the second client node 6 determines the result of the evaluation (i.e. the public output) by comparing the received $C_{r_p}^X$ to the wire keys used for the public output output wires (i.e. $C_{r_p}^1$, $C_{r_p}^0$) when the circuit 100 was garbled by the second client node 6 in step 232 to determine the 1-bit or 0-bit values of the public output output wires (step 314). This public output can be shared by the second client node 6 to any relevant party, including the server 4. The second client node 6 may also share an indication that the trigger condition has been met.

As an alternative to the method in FIG. 9, the actual values of the output wires 104 can be revealed by using and adapting the progressive revelation technique described in the "Quid-pro-quo-tocols: Strengthening semi-honest protocols with dual execution" paper, which opens (decrypts/translates) the output wires 104 bit by bit (i.e. wire by wire), starting with the trigger condition wire and stopping the opening (decrypting/translating) if the trigger condition has not been met.

Figure 10:
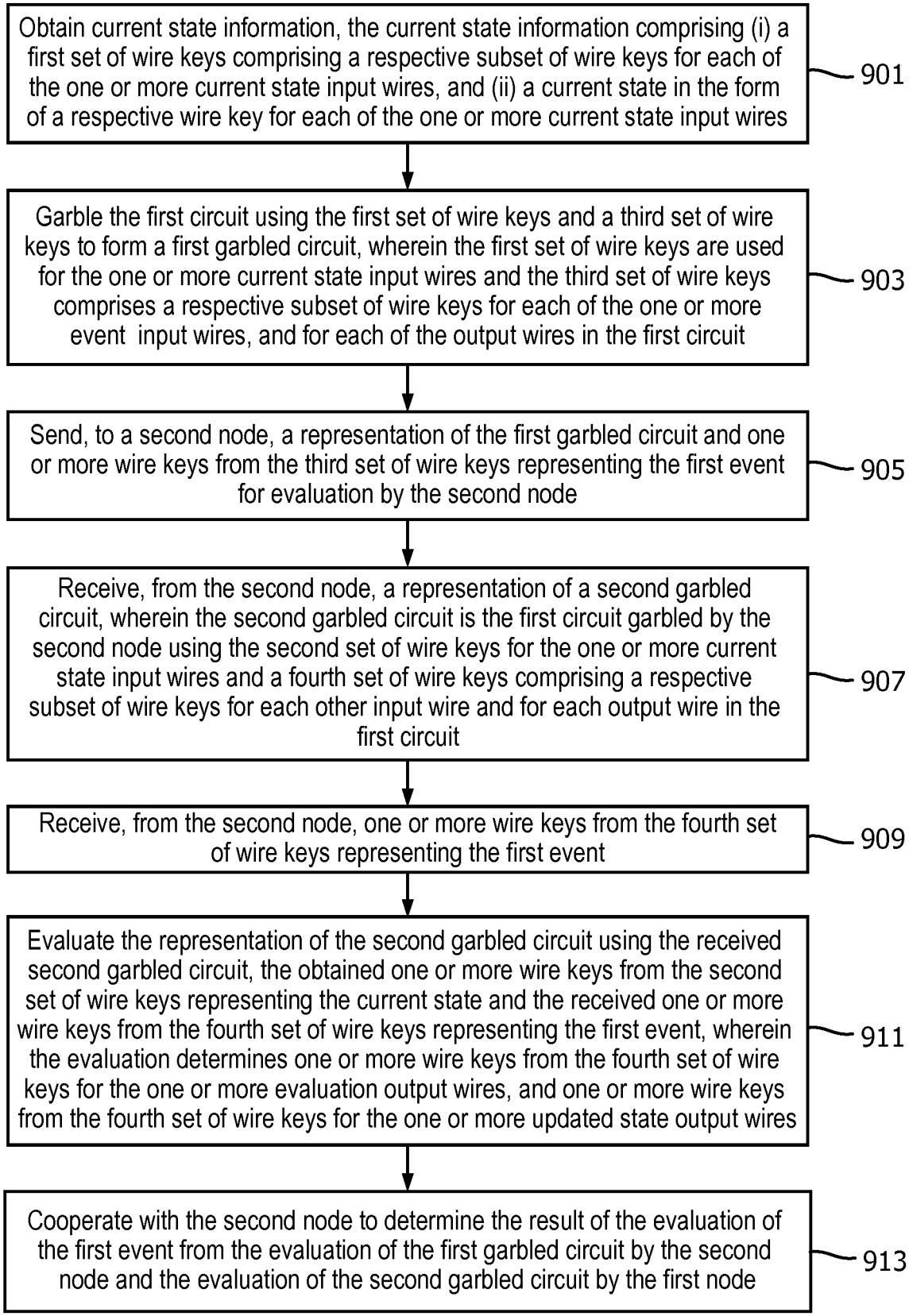
FIG. 10 is a signalling and flow diagram illustrating how the result of the evaluation of the function can be revealed to one or both of the nodes.

The flow chart in FIG. 10 illustrates a general method of operating a node 4, 6 according to various embodiments. The method is for evaluating an event using a function in conjunction with another node 4, 6. The method can be performed by the processing unit 12 or 18, for example by executing suitable computer program code stored in the memory unit 14 or 20.

In the method of FIG. 10, as in the earlier description of the techniques and embodiments presented in this disclosure, the function is represented by a first circuit 100 comprising one or more logic operations. The first circuit 100 has one or more current state input wires 108 for inputting a current state of the function into the first circuit 100 and one or more event input wires 106 for inputting the first event into the first circuit 100. The first circuit 100 also has one or more result output wires 110 for outputting an indication of the result of the evaluation of the first event using the function, and one or more updated state output wires 112 for outputting an updated state of the function.

In the first step of the method, step 901, the first node 4, 6 obtains current state information. The current state information comprises (i) a first set of wire keys comprising a respective subset of wire keys for each of the current state input wire(s) 108 (where each subset of wire keys comprises a plurality of wire keys, each wire key in the plurality being associated with a possible value for the respective current state input wire 108 (e.g. 0 and 1)), and (ii) a current state in the form of a respective wire key for each of the current state input wire(s) 108, with each respective wire key being from a second set of wire keys and each respective wire key representing a value for a respective one of the current state input wire(s) 108.

In embodiments where the first node is a client node 6 (and the second node is a server 4), step 901 can comprise the client node 6 receiving an encrypted first signal from the server 4, and the client node 6 decrypts the encrypted first signal using a secret key. Decrypting the encrypted first signal provides the first set of wire keys comprising the respective subset of wire keys for each of the current state input wire(s) 108, and the current state Sc in the form of a respective wire key for each of the one or more current state input wires 108 from a second set of wire keys.

In embodiments where the first node is a server 4 (and the second node is a client node 6), step 901 can comprise the server 4 retrieving the current state information (Ss) from a memory unit.

Next, in step 903, the first node 4, 6 garbles the first circuit 100 using the first set of wire keys and a third set of wire keys to form a first garbled circuit. In garbling the first circuit 100, the first set of wire keys are used for the current state input wire(s) 108. The third set of wire keys comprises a respective subset of wire keys for each of the event input wire(s) 106 and for each of the output wire(s) 104 in the first circuit 100. Each subset of wire keys in the third set comprises a plurality of wire keys, with each wire key in the plurality being associated with a possible value for the respective event input wire 106 or output wire 104.

In step 905, the first node 4, 6 sends a representation of the first garbled circuit and wire key(s) from the third set of wire keys representing the first event to a second node 4, 6 for evaluation by the second node 4, 6.

In embodiments where the first node is a server 4 (and the second node is a client node 6), step 905 can comprise the server 4 sending the wire key(s) from the third set of wire keys representing the first event to the second node using oblivious transfer.

In step 907, the first node 4, 6 receives a representation of a second garbled circuit from the second node 4, 6. The second garbled circuit is the same first circuit 100 that has been garbled by the second node 4, 6 using the second set of wire keys for the current state input wire(s) 108 and a fourth set of wire keys comprising a respective subset of wire keys for each other input wire 106 and for each output wire 104 in the first circuit 100.

The first node 4, 6 also receives (in step 909) one or more wire keys from the fourth set of wire keys representing the first event from the second node. Where the first node is a client node 6 (and the second node is a server 4), step 909 can comprise receiving the wire key(s) representing the first event from the server 4 using oblivious transfer.

The first node 4, 6 is then able to evaluate the representation of the second garbled circuit. Thus in step 911 the first node 4, 6 uses the received representation of the second garbled circuit, the wire key(s) from the second set of wire keys representing the current state and the received wire key(s) from the fourth set of wire keys representing the first event to determine wire key(s) from the fourth set of wire keys for the result output wire(s) 110, and wire key(s) from the fourth set of wire keys for the updated state output wire(s) 112.

Finally, in step 913, the first node 4, 6 cooperates with the second node 4, 6 to determine the result of the evaluation of the first event from the evaluation of the first garbled circuit by the second node 4, 6 and the evaluation of the second garbled circuit by the first node 4, 6.

Step 913 can comprise the first node 4, 6 receiving a wire key from the third set of wire keys for each of the result output wire(s) 110 of the first garbled circuit from the second node 4, 6, and the first node 4, 6 can determine the bit value of each of the result output wire(s) 110 based on the received wire key for each of the result output wire(s) 110 of the first garbled circuit and the respective pair of wire keys from the third set of wire keys for each of the result output wire(s) 110.

Step 913 can also or alternatively comprise sending the wire key(s) from the fourth set of wire keys for the result output wire(s) 110 of the second garbled circuit to the second node 4, 6. In this way the second node 4, 6 can translate the wire keys obtained on the result output wire(s) 110 to determine the result output.

In some embodiments, the function is for evaluating an event to determine if the event satisfies a trigger condition and for outputting a public output if an event satisfies the trigger condition. Therefore, the result output wire(s) 110 comprises one or more trigger condition output wires for outputting an indication of whether the event satisfies the trigger condition and one or more public output output wires for outputting a public output if the first event satisfies the trigger condition. In these embodiments, step 913 can comprise the first node 4, 6 sending wire key(s) from the fourth set of wire keys for the trigger condition output wire(s) to the second node 4, 6.

In these embodiments, step 913 can also or alternatively comprise the first node 4, 6 receiving wire key(s) from the third set of wire keys for the trigger condition output wire(s) from the second node 4, 6, and then determining from the received wire key(s) from the third set of wire keys for the trigger condition output wire(s) whether the first event satisfies the trigger condition.

In the above embodiments, step 913 can further comprise the first node 4, 6 sending the wire key(s) from the fourth set of wire keys for the public output output wire(s) to the second node 4, 6 if the first event is determined to satisfy the trigger condition.

In some embodiments, step 913 can also comprise receiving wire key(s) from the third set of wire keys for the public output output wire(s) from the second node 4, 6, and determining the bit value of each of the public output output wire(s) from the received wire key(s) from the third set of wire keys for the public output output wire(s) if the first event is determined to satisfy the trigger condition.

In some embodiments, in step 913 the result of the evaluation of the first event can be determined bit-by-bit.

In some embodiments, step 913 comprises performing a check for equality in the bit values represented by the wire keys determined from the evaluation of the second garbled circuit by the first node 4, 6 with the bit values represented by the wire keys determined from the evaluation of the first garbled circuit by the second node 4, 6.

This check for equality can be performed by garbling a second circuit using a fifth set of wire keys to form a third garbled circuit as described above. A representation of the third garbled circuit can be sent to the second node 4, 6 for evaluation, along with wire keys from the fifth set of wire keys representing the inputs to each of the plurality of input wires. The first node 4, 6, can receive a representation of a fourth garbled circuit from the second node (where the fourth garbled circuit is the second circuit garbled by the second node 4, 6 using a sixth set of wire keys), and the first node 4, 6 can receive wire keys from the sixth set of wire keys representing the inputs to each of the plurality of input wires. The representation of the fourth garbled circuit is then evaluated using the received fourth garbled circuit and the received plurality of wire keys from the sixth set of wire keys representing the inputs to each of the plurality of input wires to determine a value for each of the one or more equality output wires.

In embodiments where the first node is a client node 6 (and the second node is a server 4), the method can further comprise the client node 6 forming new current state information comprising the wire key(s) from the fourth set of wire keys for the updated state output wire(s) 112 and the respective pair of wire keys from the third set of wire keys for each of the updated state output wires 112, encrypting the new current state information using a secret key, and sending the encrypted new current state information to the server 4.

In embodiments where the first node is a server 4 (and the second node is a client node 6), the method can further comprise the server 4 forming new current state information comprising the wire key(s) from the fourth set of wire keys for the updated state output wire(s) 112 and the respective pair of wire keys from the third set of wire keys for each of the updated state output wire(s) 112. The server 4 then stores the new current state information.

It will be appreciated that the techniques described herein could be used for evaluating functions and events in many different areas and technical fields. Some examples are set out below.

Air quality—It may be desirable to cross-correlate information on air pollution with test results for breathing problems, to monitor if there are significant concerns. While air pollution levels could be public information, the test results on breathing problems are sensitive and distributed over various doctors, GPs and hospitals. Every time a test is taken, the test results and area code could be encrypted by the relevant GP and sent to the server. The trigger condition will be to raise an alarm if in any area the test results are significantly worse than normal.

Security Analytics—Servers keep activity logs. These logs can be used to detect attacks. An example is repeated log-in attempts from the same remote system. However, it is not always necessary to keep logs of identities for all honest users. The techniques described herein can be used to combine logging information from many different systems and perform anomaly detection. The trigger condition will be to raise an alarm and release and identity if such an anomaly has been detected.

Financial market manipulation—A framework for monitoring financial markets for market manipulation could enable the use of sensitive data, i.e. facts and insights from banks and/or traders that they would not otherwise make public. The trigger condition would be to raise an alarm and release proof when the monitoring framework identifies possible market manipulation.

Canvas cutters/Object surveillance—This involves detecting bad or suspicious behaviour involving vehicles. The first relates to criminals frequently looting trucks parked at rest stops by cutting the canvas that protects the goods. The second is about criminals casing the location of upcoming criminal activities. One way to detect these criminals is to use a camera to look for vehicles that enter several different rest stops within a couple of hours, together with some other observable behavior. These vehicle are suspicious. Other passing vehicles should remain anonymous. Using the techniques described herein, every registered vehicle could be an event. The trigger condition would be to raise an alarm and release their license plate information when a vehicle has been flagged as suspicious.

Average speed checking—Some countries have deployed average speed checking systems that measure a vehicle's speed along a stretch of road. This requires some form of storage to determine the time it took to traverse a stretch of road. Using the techniques described herein, it could be determined that a vehicle has passed two measuring stations too fast and release its licence plate, while keeping all other cars anonymous.

There are therefore provided improved techniques for evaluating a first event using a function in a privacy-preserving way.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A first node for use in evaluating a first event using a function, wherein the function is represented by a first circuit comprising one or more logic operations, the first circuit having one or more current state input wires for inputting a current state of the function into the first circuit and one or more event input wires for inputting the first event into the first circuit, and the first circuit having one or more result output wires for outputting an indication of the result of the evaluation of the first event using the function, and one or more updated state output wires for outputting an updated state of the function, the first node being configured to:

obtain current state information, wherein the current state information comprises (i) a first set of wire keys comprising a respective subset of wire keys for each of the one or more current state input wires, each subset of wire keys comprising a plurality of wire keys, each wire key in the plurality being associated with a possible value for the respective current state input wire, and (ii) a current state in the form of a respective wire key for each of the one or more current state input wires, wherein each respective wire key is from a second set of wire keys, each respective wire key representing a value for a respective one of the one or more current state input wires;

garble the first circuit using the first set of wire keys and a third set of wire keys to form a first garbled circuit, wherein the first set of wire keys are used for the one or more current state input wires and the third set of wire keys comprises a respective subset of wire keys for each of the one or more event input wires, and for each of the output wires in the first circuit, each subset of wire keys in the third set comprising a plurality of wire keys, each wire key in the plurality being associated with a possible value for the respective event input wire or output wire;

send, to a second node, a representation of the first garbled circuit and one or more wire keys from the third set of wire keys representing the first event for evaluation by the second node;

receive, from the second node, a representation of a second garbled circuit, wherein the second garbled circuit is the first circuit garbled by the second node using the second set of wire keys for the one or more current state input wires and a fourth set of wire keys comprising a respective subset of wire keys for each other input wire and for each output wire in the first circuit, each subset of wire keys in the fourth set comprising a plurality of wire keys, each wire key in the plurality being associated with a possible value for the respective other input wire or output wire;

receive, from the second node, one or more wire keys from the fourth set of wire keys representing the first event;

evaluate the representation of the second garbled circuit using the received representation of the second garbled circuit, the obtained one or more wire keys from the second set of wire keys representing the current state and the received one or more wire keys from the fourth set of wire keys representing the first event, wherein the evaluation determines one or more wire keys from the fourth set of wire keys for the one or more result output wires, and one or more wire keys from the fourth set of wire keys for the one or more updated state output wires; and cooperate with the second node to determine the result of the evaluation of the first event from the evaluation of the first garbled circuit by the second node and the evaluation of the second garbled circuit by the first node.

2. A first node as claimed in claim 1, wherein the first node is configured to cooperate with the second node to determine the result of the evaluation of the first event by:

receiving, from the second node, a wire key from the third set of wire keys for each of the one or more result output wires of the first garbled circuit; and determining the bit value of each of the one or more result output wires based on the received wire key for each of the one or more result output wires of the first garbled circuit and the respective pair of wire keys from the third set of wire keys for each of the one or more result output wires.

3. A first node as claimed in claim 1, wherein the first node is configured to cooperate with the second node to determine the result of the evaluation of the first event by:

sending, to the second node, the one or more wire keys from the fourth set of wire keys for the one or more result output wires of the second garbled circuit.

4. A first node as claimed in claim 1, wherein the function is for evaluating an event to determine if the event satisfies a trigger condition and for outputting a public output if an event satisfies the trigger condition, and wherein the one or more result output wires comprises one or more trigger condition output wires for outputting an indication of whether the event satisfies the trigger condition and one or more public output output wires for outputting a public output if the first event satisfies the trigger condition.

5. A first node as claimed in claim 4, wherein the first node is configured to cooperate with the second node to determine the result of the evaluation of the first event by:

sending, to the second node, one or more wire keys from the fourth set of wire keys for the one or more trigger condition output wires.

6. A first node as claimed in claim 4, wherein the first node is configured to cooperate with the second node to determine the result of the evaluation of the first event by:

receiving, from the second node, one or more wire keys from the third set of wire keys for the one or more trigger condition output wires; and determining from the received one or more wire keys from the third set of wire keys for the one or more trigger condition output wires whether the first event satisfies the trigger condition.

7. A first node as claimed in claim 5, wherein the first node is further configured to cooperate with the second node to determine the result of the evaluation of the first event by:

if the first event is determined to satisfy the trigger condition, sending, to the second node, the one or more wire keys from the fourth set of wire keys for the one or more public output output wires.

8. A first node as claimed in claim 6, wherein the first node is further configured to cooperate with the second node to determine the result of the evaluation of the first event by:

receiving from the second node, one or more wire keys from the third set of wire keys for the one or more public output output wires; and if the first event is determined to satisfy the trigger condition, determining the bit value of each of the one or more public output output wires from the received one or more wire keys from the third set of wire keys for the one or more public output output wires.

9. A first node as claimed in claim 1, wherein first node is configured to cooperate with the second node to determine the result of the evaluation of the first event bit-by-bit.

10. A first node as claimed in claim 1, wherein the first node is further configured to cooperate with the second node to determine the result of the evaluation of the first event by:

performing a check for equality in the bit values represented by the wire keys determined from the evaluation of the second garbled circuit by the first node with the bit values represented by the wire keys determined from the evaluation of the first garbled circuit by the second node.

11. A first node as claimed in claim 10, wherein the first node is configured to perform the check for equality by:

garbling a second circuit to form a third garbled circuit using a fifth set of wire keys, wherein the second circuit has a plurality of input wires for inputting the third set of wire keys, the fourth set of wire keys, the determined one or more wire keys from the fourth set of wire keys for the one or more result output wires, the determined one or more wire keys from the fourth set of wire keys for the one or more updated state output wires, one or more wire keys from the third set of wire keys for the one or more result output wires determined by the second node, one or more wire keys from the third set of wire keys for the one or more updated state output wires determined by the second node, and one or more equality output wires for outputting an indication of whether the bit values represented by the wire keys determined from the evaluation of the second garbled circuit by the first node are equal to the bit values represented by the wire keys determined from the evaluation of the first garbled circuit by the second node, wherein the fifth set of wire keys comprises respective pairs of wire keys for each of the plurality of input wires for the second circuit;

sending a representation of the third garbled circuit to the second node for evaluation and wire keys from the fifth set of wire keys representing the inputs to each of the plurality of input wires;

receiving a representation of a fourth garbled circuit from the second node, wherein the fourth garbled circuit is the second circuit garbled by the second node using a sixth set of wire keys;

receiving, from the second node, wire keys from the sixth set of wire keys representing the inputs to each of the plurality of input wires;

evaluate the representation of the fourth garbled circuit using the received fourth garbled circuit and the received plurality of wire keys from the sixth set of wire keys representing the inputs to each of the plurality of input wires to determine a value for each of the one or more equality output wires.

12. A first node as claimed in claim 1, wherein the first node is configured to receive the one or more wire keys from the fourth set of wire keys representing the first event from the second node using oblivious transfer.

13. A first node as claimed in claim 1, wherein the first node is configured to obtain the current state information by:
receiving an encrypted first signal from the second node;
decrypting the encrypted first signal using a secret key to obtain (i) the first set of wire keys comprising the respective subset of wire keys for each of the one or more current state input wires, and (ii) the current state in the form of a respective wire key for each of the one or more current state input wires from a second set of wire keys.

14. A computer-implemented method of operating a first node to evaluate a first event using a function, wherein the function is represented by a first circuit comprising one or more logic operations, the first circuit having one or more current state input wires for inputting a current state of the function into the first circuit and one or more event input wires for inputting the first event into the first circuit, and the first circuit having one or more result output wires for outputting an indication of the result of the evaluation of the first event using the function, and one or more updated state output wires for outputting an updated state of the function, the method comprising the steps of:
obtaining current state information, wherein the current state information comprises (i) a first set of wire keys comprising a respective subset of wire keys for each of the one or more current state input wires, each subset of wire keys comprising a plurality of wire keys, each wire key in the plurality being associated with a possible value for the respective current state input wire, and (ii) a current state in the form of a respective wire key for each of the one or more current state input wires, wherein each respective wire key is from a second set of wire keys, each respective wire key representing a value for a respective one of the one or more current state input wires;

garbling the first circuit using the first set of wire keys and a third set of wire keys to form a first garbled circuit, wherein the first set of wire keys are used for the one or more current state input wires and the third set of wire keys comprises a respective subset of wire keys for each of the one or more event input wires, and for each of the output wires in the first circuit, each subset of wire keys in the third set comprising a plurality of wire keys, each wire key in the plurality being associated with a possible value for the respective event input wire or output wire;

sending, to a second node, a representation of the first garbled circuit and one or more wire keys from the third set of wire keys representing the first event for evaluation by the second node;

receiving, from the second node, a representation of a second garbled circuit, wherein the second garbled circuit is the first circuit garbled by the second node using the second set of wire keys for the one or more current state input wires and a fourth set of wire keys comprising a respective subset of wire keys for each other input wire and for each output wire in the first circuit, each subset of wire keys in the fourth set comprising a plurality of wire keys, each wire key in the plurality being associated with a possible value for the respective other input wire or output wire;

receiving, from the second node, one or more wire keys from the fourth set of wire keys representing the first event;

evaluating the representation of the second garbled circuit using the received representation of the second garbled circuit, the obtained one or more wire keys from the second set of wire keys representing the current state and the received one or more wire keys from the fourth set of wire keys representing the first event, wherein the evaluation determines one or more wire keys from the fourth set of wire keys for the one or more result output wires, and one or more wire keys from the fourth set of wire keys for the one or more updated state output wires; and cooperating with the second node to determine the result of the evaluation of the first event from the evaluation of the first garbled circuit by the second node and the evaluation of the second garbled circuit by the first node.

15. A computer-implemented method as claimed in claim 14, wherein the step of cooperating comprises:
receiving, from the second node, a wire key from the third set of wire keys for each of the one or more result output wires of the first garbled circuit; and
determining the bit value of each of the one or more result output wires based on the received wire key for each of the one or more result output wires of the first garbled circuit and the respective pair of wire keys from the third set of wire keys for each of the one or more result output wires.

16. A computer-implemented method as claimed in claim 14, wherein the step of cooperating comprises:
sending, to the second node, the one or more wire keys from the fourth set of wire keys for the one or more result output wires of the second garbled circuit.

17. A computer-implemented method as claimed in claim 14, wherein the function is for evaluating an event to determine if the event satisfies a trigger condition and for outputting a public output if an event satisfies the trigger condition, and wherein the one or more result output wires comprises one or more trigger condition output wires for outputting an indication of whether the event satisfies the trigger condition and one or more public output output wires for outputting a public output if the first event satisfies the trigger condition.

18. A computer-implemented method as claimed in claim 17, wherein the step of cooperating comprises:
sending, to the second node, one or more wire keys from the fourth set of wire keys for the one or more trigger condition output wires.

19. A computer-implemented method as claimed in claim 17, wherein the step of cooperating comprises:
receiving, from the second node, one or more wire keys from the third set of wire keys for the one or more trigger condition output wires; and
determining from the received one or more wire keys from the third set of wire keys for the one or more trigger condition output wires whether the first event satisfies the trigger condition.

20. A computer-implemented method as claimed in claim 18, wherein the step of cooperating comprises:
if the first event is determined to satisfy the trigger condition, sending, to the second node, the one or more wire keys from the fourth set of wire keys for the one or more public output output wires.

21. A computer-implemented method as claimed in claim 19, wherein the step of cooperating comprises:
receiving from the second node, one or more wire keys from the third set of wire keys for the one or more public output output wires; and
if the first event is determined to satisfy the trigger condition, determining the bit value of each of the one or more public output output wires from the received one or more wire keys from the third set of wire keys for the one or more public output output wires.

22. A computer-implemented method as claimed in claim 14, wherein the step of cooperating comprises cooperating with the second node to determine the result of the evaluation of the first event bit-by-bit.

23. A computer-implemented method as claimed in claim 14, wherein the step of cooperating comprises:
performing a check for equality in the bit values represented by the wire keys determined from the evaluation of the second garbled circuit by the first node with the bit values represented by the wire keys determined from the evaluation of the first garbled circuit by the second node.

24. A computer-implemented method as claimed in claim 23, wherein the step of performing the check for equality comprises:
garbling a second circuit to form a third garbled circuit using a fifth set of wire keys, wherein the second circuit has a plurality of input wires for inputting the third set of wire keys, the fourth set of wire keys, the determined one or more wire keys from the fourth set of wire keys for the one or more result output wires, the determined one or more wire keys from the fourth set of wire keys for the one or more updated state output wires, one or more wire keys from the third set of wire keys for the one or more result output wires determined by the second node, one or more wire keys from the third set of wire keys for the one or more updated state output wires determined by the second node, and one or more equality output wires for outputting an indication of whether the bit values represented by the wire keys determined from the evaluation of the second garbled circuit by the first node are equal to the bit values represented by the wire keys determined from the evaluation of the first garbled circuit by the second node, wherein the fifth set of wire keys comprises respective pairs of wire keys for each of the plurality of input wires for the second circuit;
sending a representation of the third garbled circuit to the second node for evaluation and wire keys from the fifth set of wire keys representing the inputs to each of the plurality of input wires;
receiving a representation of a fourth garbled circuit from the second node, wherein the fourth garbled circuit is the second circuit garbled by the second node using a sixth set of wire keys;
receiving, from the second node, wire keys from the sixth set of wire keys representing the inputs to each of the plurality of input wires;
evaluating the representation of the fourth garbled circuit using the received fourth garbled circuit and the received plurality of wire keys from the sixth set of wire keys representing the inputs to each of the plurality of input wires to determine a value for each of the one or more equality output wires.

* * * * *